(12) United States Patent
Buscaglia et al.

(10) Patent No.: US 11,494,740 B1
(45) Date of Patent: Nov. 8, 2022

(54) TECHNIQUES FOR PROVIDING ALERTS IN A TIME AND ATTENDANCE SYSTEM

(71) Applicant: People Center, Inc., San Francisco, CA (US)

(72) Inventors: Daniel Robert Buscaglia, San Francisco, CA (US); Dilanka Theshan Dharmasena, Silver Spring, MD (US); Sachith Gullapalli, San Francisco, CA (US); Vivek Raj Katara, San Francisco, CA (US)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

(21) Appl. No.: 17/514,366

(22) Filed: Oct. 29, 2021

(51) Int. Cl.
*G06Q 10/10* (2012.01)
(52) U.S. Cl.
CPC ............... *G06Q 10/1091* (2013.01)
(58) Field of Classification Search
CPC ........ G06Q 10/00; G06Q 10/06; G06Q 10/10; G06Q 10/109; G06Q 10/1091; G06Q 10/1093; G06Q 10/1097
See application file for complete search history.

(56) References Cited

U.S. PATENT DOCUMENTS

| | | | | |
|---|---|---|---|---|
| 10,489,430 B1* | 11/2019 | Rogynskyy | ............. | H04W 4/24 |
| 2006/0095315 A1* | 5/2006 | Ano | ............. | G06Q 10/06398 |
| | | | | 705/7.42 |
| 2008/0060058 A1* | 3/2008 | Shea | ............. | G06F 21/604 |
| | | | | 726/4 |
| 2019/0057340 A1* | 2/2019 | Wang | ............. | G06F 16/29 |
| 2020/0005174 A1* | 1/2020 | Scholz | ............. | G06F 3/04847 |
| 2020/0372016 A1* | 11/2020 | Rogynskyy | ............. | G06Q 10/107 |
| 2020/0372075 A1* | 11/2020 | Rogynskyy | ............. | G06F 40/30 |
| 2021/0149925 A1* | 5/2021 | Mann | ............. | G06F 21/6227 |

OTHER PUBLICATIONS

Kifor et al., Workforce Analytics in Teleworking, Jan. 1, 2021, IEEE Access, vol. 9, pp. 156451-156464 (Year: 2021).*

* cited by examiner

*Primary Examiner* — Robert D Rines
(74) *Attorney, Agent, or Firm* — Dority & Manning, P.A.

(57) ABSTRACT

Techniques for providing alerts in a system that implements an organizational management platform to manage applications for an organization are disclosed. The method can include accessing organizational data associated with the organization. A rule having a condition for activation of a trigger can be received from a user interface. A dependency map having data objects that are associated with the rule can be generated by the system. A change in a first data object from the data objects can be determined. Additionally, a dependency between the rule and the first data object can be determined based on the dependency map. Moreover, the condition for the activation of the trigger can be determined to be satisfied based on the determined change. Subsequently, an action associated with the activation of the trigger can be performed based on the condition for the activation of the trigger being satisfied.

20 Claims, 9 Drawing Sheets

FIG. 8A

DEFINE A TRIGGER — TRIGGER EVENT OR FIELD

TRIGGER OBJECT > EMPLOYEE

- COMPANY
- EMPLOYEE
- DEVICE
- PAYROLL
- DOCUMENT
- TIME AND ATTENDANCE

EMPLOYEE
▾ COMPENSATION

- ANNUAL COMPENSATION
- ANNUAL SALARY EQUIVALENT
- BONUS SCHEDULE
- COMPENSATION CURRENCY
- COMPENSATION DESCRIPTION
- COMPENSATION TIME PERIOD
- COMPENSATION VALUE
- EQUITY VESTING SCHEDULE >
- HOURLY RATE

ADD CONDITION

FIG. 8B

DEFINE A TRIGGER — TRIGGER EVENT OR FIELD

TRIGGER OBJECT > EMPLOYEE > ANNUAL COMPENSATION

EMPLOYEE
▾ COMPENSATION

- ANNUAL COMPENSATION
- ANNUAL SALARY EQUIVALENT
- BONUS SCHEDULE
- COMPENSATION CURRENCY
- COMPENSATION DESCRIPTION
- COMPENSATION TIME PERIOD
- COMPENSATION VALUE
- EQUITY VESTING SCHEDULE >
- HOURLY RATE

ANNUAL COMPENSATION
SET A CONDITION BASED ON THE EMPLOYEE'S ANNUAL COMPENSATION. THIS CALCULATION ASSUMES 40-HOUR WORK WEEKS FOR EMPLOYEES WITH AN HOURLY WAGE.

CHANGES BY ▾

A VALUE MORE THAN ▾

$1

ADD CONDITION

TECHNIQUES FOR PROVIDING ALERTS IN A TIME AND ATTENDANCE SYSTEM

FIELD

The present disclosure generally relates to computer systems and databases with real-time alert systems. More particularly, the present disclosure relates to providing trigger operations in an organizational management platform and performing actions in response to an activation of the trigger.

BACKGROUND

A database generally refers to a type of computer program that primarily stores and retrieves data. The database generally may execute procedural instructions from a database trigger in response to a certain event involving a particular table or view within the database. However, database triggers generally are limited to operations performed on objects within a database. As such, database triggers are unable to support various types of operations associated with maintaining an enterprise system of record integrated with applications (e.g., time and attendance application). Therefore, a need exists for providing triggers that support operations associated with enterprise systems of record integrated with applications.

Additionally, due to the large scale of data stored in a database, conventional systems may not be able to determine in real-time the values of data objects. Conventional systems may not be able access data that is changing in real-time and react to the changes dynamically. Therefore, a need exists for systems that store, access, and determine in real-time the values stored in a large database.

SUMMARY

Aspects and advantages of embodiments of the present disclosure will be set forth in part in the following description, or can be learned from the description, or can be learned through practice of the embodiments.

One example aspect of the present disclosure is directed to a computer system that implements an organizational management platform to manage applications for an organization. The computer system includes one or more processors. The computer system includes one or more databases that collectively store organizational data associated with the organization, wherein the organizational data includes an object graph data structure having a plurality of data objects associated with the organizational data. The computer system includes one or more non-transitory computer-readable media that collectively store instructions that, when executed by the one or more processors, cause the computer system to perform operations. The operations include receiving, from a user interface, a rule associated with a trigger, the rule having a condition for activation of the trigger. Additionally, the operations include generating a dependency map associated with the rule, the dependency map having one or more data objects from the plurality of the data objects that are associated with the rule, detecting a change in a first data object from the plurality of the data objects, determining a dependency between the rule and the first data object based on the dependency map, determining that the condition for the activation of the trigger is satisfied based on the detected change in the first data object, and performing an action associated with the activation of the trigger based on the determination that the condition for the activation of the trigger has been satisfied.

Another example aspect of the present disclosure is directed to a computer-implemented method for implementing an organization management platform to manage applications for an organization. For example, the computer-implemented method performed by one or more computing devices can access organizational data associated with the organization. The organizational data can include an object graph data structure comprising a plurality of data objects associated with the organizational data. Additionally, the method can receive a rule associated with a trigger. The rule can have a condition for activation of the trigger. Also, the method can generate a dependency map associated with the rule. The dependency map can have one or more data objects from the plurality of the data objects that are associated with the rule. The method can determine a change in a first data object from the plurality of the data objects. The method can determine a dependency between the rule and the first data object based on the dependency map. In some instances, the dependency can be also based on the condition for the activation of the trigger. Moreover, the method can determine that the condition for the activation of the trigger is satisfied based on the determined change in the first data object. Furthermore, the method can perform an action associated with the activation of the trigger based on the determination that the condition for the activation of the trigger has been satisfied.

Another example aspect of the present disclosure is directed to one or more tangible non-transitory computer-readable media storing computer-readable instructions that, when executed by one or more processors, cause the one or more processors of a computing system to perform operations. For example, the operations can access organizational data associated with the organization. The organizational data can include an object graph data structure comprising a plurality of data objects associated with the organizational data. The operations can receive a rule associated with a trigger. The rule can have a condition for activation of the trigger. Additionally, the operations generate a dependency map associated with the rule. The dependency map can have one or more data objects from the plurality of the data objects that are associated with the rule. The operations can determine a change in a first data object from the plurality of the data objects. The operations can determine dependency between the rule and the first data object based on the dependency map. In some instances, the dependency can be also based on the condition for the activation of the trigger. Moreover, the operations can determine that the condition for the activation of the trigger is satisfied based on the determined change in the first data object. Furthermore, the operations can perform an action associated with the activation of the trigger based on the determination that the condition for the activation of the trigger has been satisfied.

Other aspects of the present disclosure are directed to various systems, apparatuses, non-transitory computer-readable media, user interfaces, and devices for providing triggers in a system of record. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 8A depicts an illustration of an example user interface for defining a condition for a trigger object when configuring a trigger associated with a rule, according to example embodiments of the present disclosure.

FIG. 8B depicts an illustration of an example user interface for defining a condition for a trigger object when configuring a trigger associated with a rule, according to example embodiments of the present disclosure.

Figure 1:
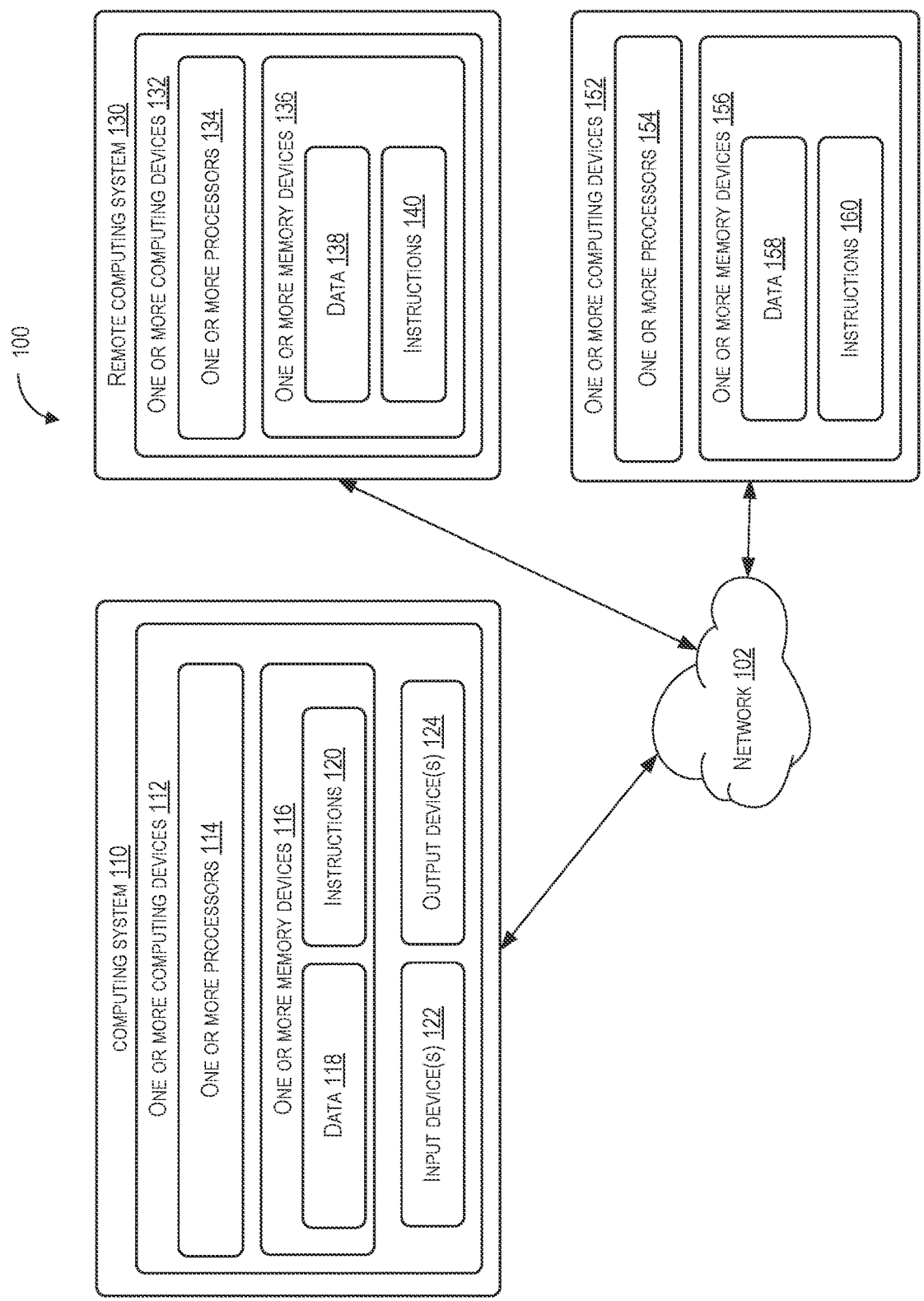
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

Generally, the present disclosure is directed to improved computer systems, computer applications, computer-implemented methods, user interfaces, and/or services for providing triggers in a system of record that manages organizational data and performing an action associated with the activation of the trigger. In some instances, the trigger and the action can be associated with a time and attendance application. For example, the activation of the trigger can be based on the attendance data of an employee and the action can be performed on the organization management platform. The attendance data of the employee can be managed by the time and attendance application that is integrated with the organization management platform.

Organizations generally use many different types of applications and computer systems to sustain operations. Such applications and computer systems generally rely on organizational data and processing tied to organizational data. Usually, organizational data is generated, modified, and utilized separately across various different types of third-party applications and computer systems. For example, various different third-party applications and computer systems may generate and/or store portions of organizational data, may perform operations based on organizational data, may provide applications and related services to users based on organizational data, etc. However, this leaves organizations responsible for ensuring that their own organizational data is updated consistently and regularly across a variety of different applications and computer systems. In many cases, organizational data and associated processes become out of sync when not updated consistently. As such, organizations generally are left to performing continuous manual processing of organizational data, coordinating and ensuring compatibility between changing configurations across each of multiple different third-party applications and computer systems, and/or building their own expensive, proprietary integrations across various third-party applications and computer systems that must be maintained and updated (e.g., when organizational procedures change, based on organizational data management changes, when vendors update their own proprietary third-party applications, etc.). As such, organizations can benefit from improved computer systems, computer applications, computer-implemented methods, user interfaces, and related services for providing triggers in a system of record that manages organizational data and associated operations performed based on the organizational data across separate third-party applications.

The present disclosure describes examples for providing alerts in a system of record that manages organizational data and associated operations across various third-party applications. In examples of the present disclosure, a computer system may perform an action associated with an activation of a trigger. The trigger can include a set of one or more conditions for activation of the trigger and a set of one or more operations for execution based on the activation of the trigger. Example implementations of the present disclosure can be implemented in the context of or as a portion of an organizational data management platform that controls and leverages organizational data to manage organizational applications such as payroll, operations, human resources (e.g., onboarding and offboarding), benefits, information technology and device management, third-party application integration and access, and many others.

The organizational data management platform can hold, for each of one or more organizations, a centralized set of organizational data that acts as a single, centralized system of record for all organizational management processes for that organization. Each organization can include a number of users which are able to access and interact with the organizational data management platform. Some users may have administrative permissions which define whether the user is able to access and/or modify certain types of organizational data for their organization.

The organizational data for each organization can include data directly entered into the organizational data management platform and/or can include data retrieved, pulled, or otherwise obtained from one or more first party and/or third-party applications with which the organizational data management platform may have varying levels of integration. This ingestion and storage of data from third-party applications is in contrast to systems which simply sit on top of third-party applications and apply rules at run time.

The organizational data can, in some implementations, be held as one or more object databases. For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database can be represented as or can store data which can be represented as one or more graphs with nodes that correspond to data objects and edges that correspond to links or logical associations between objects and/or object attributes. Graphs can be traversed to understand or leverage relationships among objects and their attributes. In one example, the organizational data can be synthesized into a single graph which includes multiple classes of objects and defines complex relationships among objects and their attributes. For example, all workflows, including payroll, IT, etc. can be run through one platform and graph. In some implementations, the employee objects can be referred to and/or treated as sentinel nodes.

The systems, methods, and computer program products described herein provide a number of technical effects and benefits. As one example, the embodiments described in the present disclosure provide configurable application alerts in real-time for a system of record that provide automated evaluation of conditions and automated execution of operations within the system of record. Operations can also be executed in separate third-party applications that utilize different underlying technologies and technical designs, for example, more efficiently and with fewer computing resources (e.g., less processing power, less memory usage, less power consumption, etc.), than would otherwise be wasted by maintaining custom, proprietary, and/or manual synchronization processes. In particular, examples of the present disclosure provide automation of trigger operations in a system of record and across different applications and systems using a rigorous computerized process.

In some instances, the time and attendance application can be a real-time alert system that can gather time and attendance data of employees of an organization in real-time. For example, the time and attendance application can obtain the time and attendance data of employees when an event occurs (e.g., clocking-in, clocking-out) or at a certain time interval (e.g., every five minutes, every ten minutes). The time and attendance application can be a standalone application or a third-party application. The time and attendance application can be integrated with the organization management platform that manages applications for an organization. The time and attendance application can communicate (e.g., send and receive data) directly with the applications for the organization, or the time and attendance application can communicate with the applications through the organization management platform.

The time and attendance application can track dependencies of a specific alert, the conditions for activating the specific alert, the different policies applied to different users (e.g., employees, managers), and actions to be performed with the activation of the specific alert. The time and attendance application can be a standalone system to optimize for determining a condition for the activation of a trigger that may occur in the future based on information currently available. Additionally, the time and attendance application can train a machine-learning model and use a machined-learned model to determine a condition for the activation of the trigger based on a dependency map.

The dependency map can include one or more data objects from a plurality of data objects that are associated with a rule. For example, the organizational data associated with the organizational management platform can include an object graph data structure. The object graph structure can include a plurality of data objects associated with the organizational data. The rule can have one or more conditions for activation of the trigger. The dependency map can have specific use cases for certain rules based on the machined-learned model. As a result, the time and attendance application can have a predictive trigger, which allows for an action (e.g., alert) to be performed prior to an event (e.g., employee working overtime in a pay period) occurring. Conventional systems may only have triggers that are activated once the event has occurred, which in some instances, may be too late for a user (e.g., manager) to react to the event.

For example, the real-time alert system of the time and attendance application can send an alert to a manager of an employee to alert the manager that the employee is expected to work overtime in the current pay period. Continuing with this example, the time and attendance application can access (e.g., obtain, retrieve) the amount of time an employee has already worked, the expected amount to time the employee is expected to work in a future period (e.g., number of future hours expected to work in the current pay period), and determine whether the employee will be working overtime in the current pay period. The amount of time an employee has already worked can be accessed automatically in real-time and a trigger can be activated when determined that overtime will likely occur during the current pay period.

Due to the scale of data, conventional systems may not be able to determine in real-time the values of data objects that constantly change. Therefore, conventional systems may not be able to be set up with predictive triggers and may not be able to use reactionary predictive models. In contrast, the time and attendance application, using the dependency map, can store, access, and determine in real-time the values of dependencies (e.g., data objects) that constantly change by accessing the data objects in real-time. The dependency map can allow the time and attendance application to monitor (e.g., access, retrieve, database query) specific data objects that have a relationship with conditions for activating a trigger. In some instances, the time and attendance application can access all of the specific data objects and metadata associated with a condition for activating a trigger at a regular interval (e.g., every five minutes). Additionally, when the value of a data object changes, it can trigger a determination by the time and attendance application on whether the change has satisfied a condition for the activation of a trigger. Additionally, the time and attendance application can use machine-learned reactionary predictive models to determine whether an event in the future will occur. Moreover, a reactionary predictive model can be further trained based on the dependency map, the conditions for activating a trigger, the determination on whether an event in the future will occur based on the conditions, and whether the event in the future did occur.

The dependency map can track dependencies (e.g., data objects) associated with conditions that activate a trigger. The dependency map allows for symbolic understanding of the conditions and dependencies, in contrast with a conventional system that activates a trigger when a data object is either true or false. With the dependency map, instead of a condition being dependent on data objects, the time and attendance application allows for the condition to be dependent upon any object that has a relationship with the conditions for activating the trigger. In some instances, when the value of one of the data objects changes, the time and attendance application performs a refresh action. The refresh action can include retrieving the values for the dependencies associated with a rule. In some instances, the refresh action can include retrieving some of the values for the data objects from the plurality of data objects, where the data retrieved is based on the dependency map for a specific rule.

For example, when an employee either clocks into work or clocks out of work, the time and attendance application can determine that a change in a first data object has occurred, and as a result, perform a refresh action. By using the dependency map associated with a specific rule, the time and attendance application can retrieve the values for all of the dependencies associated with the specific rule. The dependency map can include all of the data objects for the time and attendance application to check (e.g., retrieve the value associated with the data object) when a change in the first data object has occurred. The dependency map can be generated based on the specific rule, and the conditions associated with the specific rule. The time and attendance application can select, based on the dependency map, a subset of data objects from the plurality of data objects to retrieve data from. The subset of data objects can be the dependencies associated with the specific rule. Subsequently, the time and attendance application can determine whether a condition for activating a trigger associated with the specific rule has been satisfied based on the retrieved values for all of the dependencies associated with the rule. The time and attendance application can perform an action (e.g., alert, approval request) when one of the conditions for activating the trigger is satisfied.

In another example, the time and attendance application can access the data objects associated with the specific rule in real-time using the dependency map. The dependency map allows for the time and attendance application to determine and filter only for the data objects that are associated with the specific rule. Due to the filter, a limited amount of data is retrieved, which allows for the time and attendance application to retrieve the data in real-time. By retrieving the data in real-time, the triggers and actions performed (e.g., approval process) can be based on real-time data. When the value of the data object has been changed, then the time and attendance application can make a determination on whether the conditions for the activation of the specific rule has been activated. The time and attendance application can also use timeline markers to perform an action at a later time in the future if further conditions are satisfied in the future.

To illustrate, the time and attendance can obtain real-time attendance data and set a condition stating when the amount of time worked is above a threshold than it is overtime, which can require additional approval. The time and attendance application allows managers to approve overtime requests in real-time or prior to the overtime occurring using the machined-learned predictive models. In another example, a manager of a department may want to keep the overall labor amount of the department below a certain threshold. The time and attendance application can, using the predictive model, alert the manager prior to the threshold being exceeded, and can also alert the manager in real-time when the threshold is exceeded. The time and attendance application allows for tasks (e.g., alerts, approvals) to be automated in real-time while users (e.g., employee, manager) are working. Automated approvals can reduce distractions to users and real-time alerts can improve budget efficiencies and other preventative measures. Real-time updates and alerts can be useful for better expense management of an organization.

The time and attendance application allows alerts to be triggered based on a rule-based engine. The rule-based engine enables a user to have more flexibility by configuring rules that are custom-tailored to the user. The rule-based engine of the time and attendance application supports various levels of flexibility for setting up rules. For example, a user can set up (e.g., compose) a rule based on different conditions (e.g., attributes stored in a database, data objects stored in the organizational data) by filtering on the different conditions. The user can write a rule associated with a certain action to be performed when a change occurs in one or more of the conditions. The flexibility also allows users to set up custom-made triggers based on the different conditions, and different actions to be performed when the trigger is activated. Additionally, the rule-based engine and the predictive model allow for a user to set rules that can trigger an alert prior to the event occurring. Furthermore, a second alert can be triggered when the event does occur.

The time and attendance application can generate a dependency map that includes a mapping between data objects and their dependencies. The mapping can include relationships (e.g., first-degree relationship, second-degree relationship, third-degree relationship) between two different data objects. Additionally, the dependency map can be updated when the relationships between two different data objects change. For example, if an employee moves to a different department in the same organization, then the dependency map is updated based on this update. The dependency map can include two-way mapping, which can allow for the dependency map to be easily updated when any changes occur in the object graph data structure.

In some instances, a user (e.g., customer) can write a new rule using a user interface of the organizational management platform. The organizational management platform can have organizational data that includes an object graph data structure. The object graph data structure can include a plurality of data objects. The rule can have one or more conditions for activation of a trigger. As illustrated in the airline pilot example below, the rule can be associated with metadata, and the one or more conditions can be determined by the computing system based on the metadata. The new rule can be automatically mapped to data objects in the object graph data structure based on the dependency map and the metadata associated with each data object. For example, the mapping can be performed using an applicative functor. The applicative functor can automatically do the mapping for the rule based on the metadata for the rule and the metadata for each data object. Using the applicative functor, the mapping can be expressed in a context, and the context can describe the data dependency. Applicative functors can allow for functorial computations to be sequenced without using results from prior computations in the definition of subsequent ones.

Once the rule is mapped to one or more dependencies (e.g., a subset of data objects from the plurality of data objects in the object graph data structure) using the dependency map, then the alerts can be based on these dependencies. Therefore, when a change in one of the dependencies (e.g., a first data object) is detected, then the system can determine whether a condition for the activation of a trigger has been satisfied. Subsequently, the system can perform an action associated with the rule based on the activation of the trigger. Alternatively, the system can perform an action at a time in the future if a second trigger is activated. The second trigger being associated with a second set of conditions for activation of the second trigger.

For example, the rule can be that an airplane pilot cannot work a certain number of hours in a week, and the condition for this rule can be associated with data objects (e.g., employee records) and metadata that includes 'pilot' as a job title. Therefore, the conditions with this rule can be to activate an alert when an employee who is a 'pilot' is expected to exceed a certain number of hours worked in a week. One benefit as highlighted by this example is that it allows human resources to automatically set custom rules that abide by the rules and regulations of a certain industry. The custom rules can provide alerts in real-time and can provide predictive alerts, which can be critical given the rules and regulations associated with a specific industry. For example, if the pilot worked longer than expected hours (e.g., first flight was delayed) and the pilot is expected to fly again tomorrow in a second flight, it could result in the pilot exceeding a certain number of hours in a week, then the system can send a predictive alert prior to the second flight.

In some instances, the time and attendance application can be synchronized with third-party applications (e.g., payroll) associated with the organizational management platform. For example, the time and attendance application can determine that an employee has worked overtime based on the rules received from the user interface. When determined that the employee has worked overtime, the computing system can perform an action, such as automatically updating the number of hours worked in the third-party application (e.g., payroll application) so that the employee is automatically compensated for the overtime.

In some instances, the time and attendance application can include a predictive trigger. The predictive trigger can be associated with a timeline marker. The timeline marker for a predictive trigger can be associated with a first condition, and a second condition at a certain time after the first condition has been met. The system can create a predictive alert in the future based on projecting the current status forward. For example, if the current status continues (e.g., employee keeps working) at a certain time in the future, then an action is performed (alert is presented to a user). Alternatively, if the current status does not continue (e.g., employee stops working) at a certain time in the future, then the action is canceled.

In some instances, the time and attendance application can dynamically (e.g., in real-time) change conditions for approval based on updated information received from the organizational data. The conditions can be changed automatically (e.g., without user input) based on updated information. For example, a rule can be set to send an alert when a set of employees from a certain group do not meet a certain threshold value for a performance attribute. When updated information is received that a first employee from the set of employees is on leave (e.g., vacation), then the time and attendance application can automatically update the conditions associated with the rule to exclude the first employee for the rule.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, 152) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated with performing an action associated with the activation of a trigger for a time and attendance application. The trigger can be based on a rule received from a user interface. Further, the one or more memory devices 116 can store the data 118 and/or the instructions 120, which can be executed by the one or more processors 114 to cause the one or more computing devices 112 to perform one or more operations. For example, the one or more operations performed by the one or more processors 114 can include receiving, from a user interface, a rule associated with a trigger, the rule having a condition for activation of the trigger, generating a dependency map associated with the rule, the dependency map having one or more data objects from the plurality of the data objects that are associated with the rule, detecting a change in a first data object from the plurality of the data objects, determining a dependency between the rule and the first data object based on the dependency map, determining that the condition for the activation of the trigger is satisfied based on the detected change in the first data object and the condition for activation of the trigger; and performing an action associated with the activation of the trigger based on the determination that the condition for the activation of the trigger has been satisfied.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), time and attendance data (e.g., time data associated with an employee or a group of employees, attendance data associated with an employee or group of employees), policy data (e.g., application policy data, organization policy data, policy data that includes one or policies associated with the organizational data, the rule data, the application data, time and attendance data, one or more applications, one or more devices, etc.), data that includes instructions in a custom computer language (e.g., a custom query language based on organizational data), data that includes rules associated with the custom computer language, and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage one or more applications.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., performing an action based on an activation of a trigger) based at least in part on the one or more inputs.

The remote computing system 130 includes one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102. In some embodiments, the remote computing system 130 can include one or more applications (e.g., computer software applications comprising computer instructions) that can be stored and/or executed by the remote computing system 130.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102. In some embodiments, the one or more computing devices 152 can include one or more applications (e.g., computer software applications comprising computer instructions) that can be stored and/or executed by such one or more computing devices 152.

Figure 2:
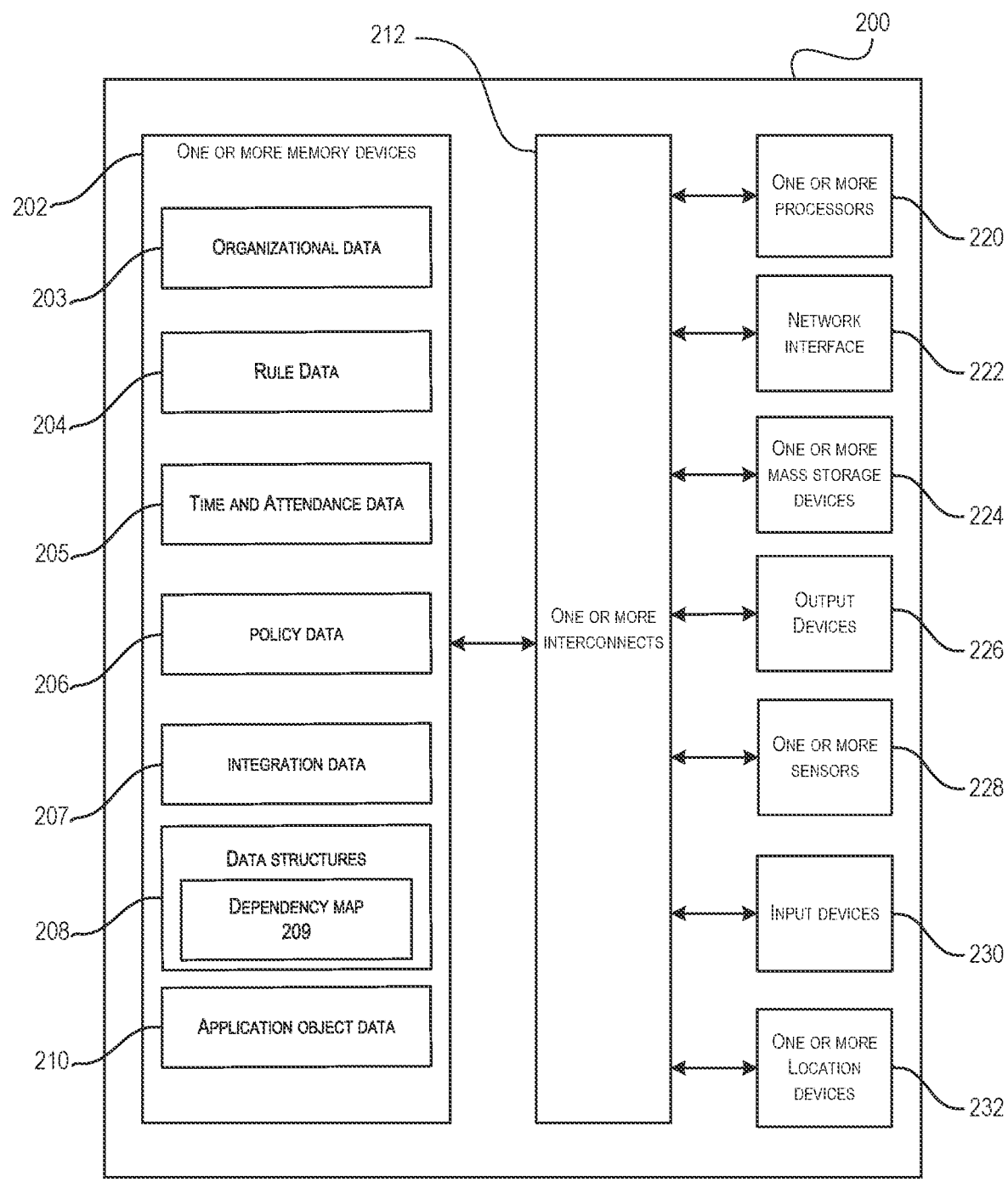
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, time and attendance data 205, policy data 206, integration data 207, data structures 208, application object data 210, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, time and attendance data 205, policy data 206, integration data 207, data structures 208, application object data 210, and/or any other types of data). Further, the one or more memory devices 202 can include one or more non-transitory computer-readable storage media, including RAM, ROM, EEPROM, EPROM, flash memory devices, magnetic disks, and any combination thereof. The information and/or data stored by the one or more memory devices 202 can be executed by the one or more processors 220 to cause the computing device 200 to perform one or more operations described herein.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200. In some instances, the organization data 203 can include the rule data 204, the time and attendance data 205, the policy data 206, the integration data 207, the data structures 208, and the application object data 210.

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with one or more rules that can be used to generate and/or implement an application policy, a dependency map, a trigger, an action based on the activation of the trigger, and so on. The rule data 204 also can include information associated with one or more rules of an organizational data management system (e.g., base or default rules provided or enforced by the system, one or more custom rules configured by an organization, etc.). In some embodiments, the rule data 204 can be received from one or more computing systems (e.g., the remote computing system 130 depicted in FIG. 1), which can include one or more computing systems that are remote from the computing device 200.

The time and attendance data 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Additionally, the time and attendance 205 can include information associated with a current amount of time worked by an employee or group of employees, expected amount of time to be worked by an employee or group of employee in a specific time period (e.g., day, weekly, bi-weekly, monthly, annually). Furthermore, the time and attendance data 205 can include information associated with attendance (e.g., sick leave, paid time off, federal holidays, overtime, clock-in time, clock-out time) of an employee or group of employees. In some instances, the time and attendance data 205 can be collected in real-time and uploaded to the computing system 110 or retrieved by the computing system periodically (e.g., every five minutes, every fifteen minute). In some embodiments, the time and attendance data 205 can be received from one or more computing systems (e.g., the remote computing system 130 depicted in FIG. 1) which can include one or more computing systems that are remote from the computing device 200.

The policy data 206 (application policy data, organization policy data) can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Additionally, the organization policy data can include information associated with one or more organizational policies that are used to regulate one or more applications (e.g., one or more third-party applications), one or more computing devices, and/or one or more records which can include one or more organizational records and/or one or more employee records. Furthermore, the application policy data can include information associated with one or more policies that are used to implement an application policy associated with one or more applications (e.g., one or more third-party applications), one or more computing devices, and/or one or more records which can include one or more organizational records and/or one or more employee records. In some embodiments, the policy data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data 203) among one or more applications. For example, the integration data 207 can include information that enables integration and synchronization between each of one or more applications (e.g., third-party applications and/or other applications). In an embodiment, the integration data 207 provides integration information that allows an organizational data management system (e.g., a system of record for organizational data and organizational data processing), for example, to obtain information from one or more applications (e.g., third party and/or other applications), to perform operations involving organizational data (e.g., organizational data 203) in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, time information, attendance information and/or any other types of entities representing or related to managing organizational data (e.g., organizational data 203).

The data structures 208 also can define various relationships among the various entities associated with organizational data. For example, the data structures 208 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data 203 based on one or more organizational data management applications).

In some embodiments, the data structures 208 can include one or more object graphs (e.g., based on an object graph data model) providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities, entity attributes, entity attribute categories, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

In some instances, a dependency map 209 generated by the computing system 110 can be part of the data structures 208. The dependency map 209 can define various relationships among the various entities (e.g., data object) and a rule received by the computing system 110. The relationships can be defined by the computing system 110 based on the object graphs and the application object data 210.

The application object data 210 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application object data 210 generally can include any information used to implement any particular type of application object or associated data structure that stores, references, utilizes, and/or processes data (e.g., organizational data 203). For example, such types of application objects generally may include, but are not limited to, application triggers, actions performed based on a trigger, reports, workflows, tasks, custom application objects, and/or any other types of objects used to store and/or process data in a system of record, such as an organizational data management system. Further, application object data 210 used to implement any particular type of application object or associated data structure may include, but is not limited to, instructions in a computer language (e.g., a custom computer language provided by an organizational data management system for managing organizational data 203), metadata associated with application objects or related data structures, data associated with one or more particular instances of application objects or related data structures, data associated with configuration of one or more application objects or related data structures, etc. In some embodiments, the application object data 210 can be received from one or more computing systems (e.g., the remote computing system 130 depicted in FIG. 1) which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, time and attendance data 205, policy data 206, integration data 207, data structures 208, application object data 210, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the time and attendance data 205, the policy data 206, the integration data 207, the data structures 208, the application object data 210, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the time and attendance data 205, the policy data 206, the integration data 207, the data structures 208, the application object data 210, and/or any other data. The one or more output devices 226 can include one or more display devices (e.g., liquid crystal display (LCD), OLED display, miniLED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200). Further, the one or more input devices 230 can be used to provide input (e.g., a rule associated with a trigger that is received from a user input of a user) that can be used as part of invoking or performing one or more operations. For example, the one or more input devices 228 can be used to receive a rule associated with a trigger for the computing system 110 to perform an action based on the activation of the trigger.

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the Global Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
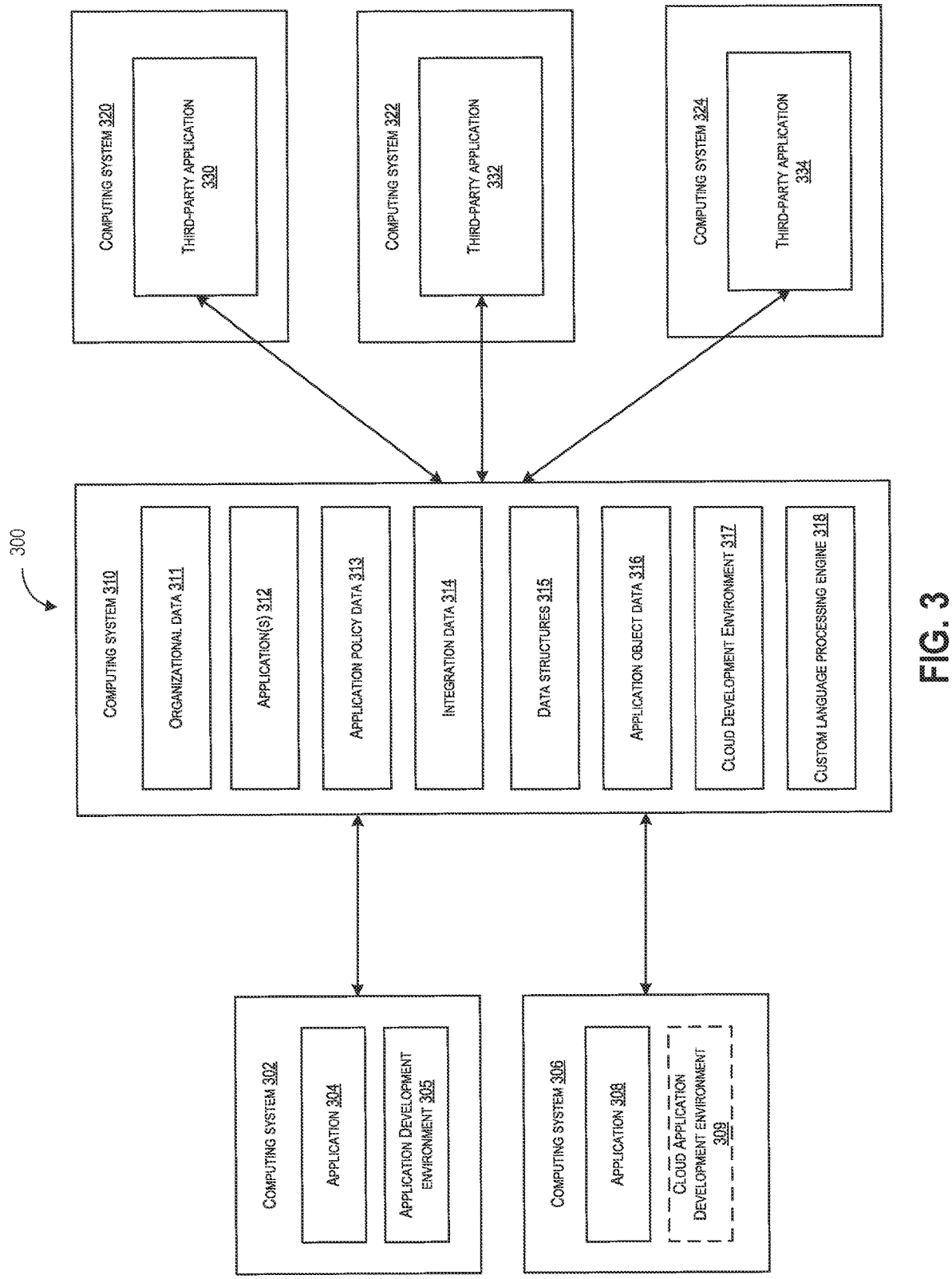
FIG. 3 depicts a block diagram of an example computing environment including multiple computing systems, according to example embodiments of the present disclosure.

FIG. 3 depicts a block diagram of an example computing environment 300 including multiple computing systems, according to example embodiments of the present disclosure. Any of computing system 302, computing system 306, computing system 310, computing system 320, computing system 322, or computing system 324 can include one or more attributes and/or capabilities of the computing system 110, the remote computing system 130, the one or more computing devices 152, and/or the computing device 200. Furthermore, any of the computing system 302, the computing system 306, the computing system 310, the computing system 320, the computing system 322, or the computing system 324 can be configured to perform one or more operations and/or one or more actions that can be performed by the computing system 110, the remote computing system 130, the one or more computing devices 152, and/or the computing device 200.

As shown in FIG. 3, the environment 300 includes the computing system 302, an application 304, an application development environment 305, the computing system 306, an application 308, a cloud application development environment 309, the computing system 310, organizational data 311 (e.g., organizational data 203), one or more application(s) 312, application policy data 313, integration data 314, data structures 315, application object data 316, cloud development environment 317, custom language processing engine 318, computing systems 320, 322, 324, and third-party applications 330, 332, 334.

In an embodiment, the computing system 302, the computing system 306, the computing system 310, the computing system 320, the computing system 322, and/or the computing system(s) 324 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include a time and attendance application that performs one or more operations on the computing system 302 and includes time and attendance data 205 associated with an organizational record that is stored as part of the organizational data 311. In an example, a user associated with any computing system 302, 306, 310 can use a portion of the organizational data 311 associated with their employee record to access a corresponding account associated with one or more of application 304, application 308, and/or application(s) 312.

In an embodiment, one or more application(s) 312 provide access to, utilize, support, and/or otherwise provide various interfaces or services that enable other applications (e.g., application 304, application development environment 305, application 308, cloud application development environment 309, application(s) 312) and/or users to perform various operations and activities involving one or more custom computer languages. For example, a custom computer language (e.g., a custom query language) generally may provide users with a simplified set of computer instructions that align with or match a user's understanding of a functional or business environment, such as an organization, business, industry, sector, etc. In some embodiments, each of one or more custom computer languages is a user language that allows users with a basic understanding of a subject, topic, business area, organization, functional role, industry, sector, etc. to implement custom computer instructions in terms that are familiar to the users, without knowledge of a complex computer programming language, without dependence on computer programmers, without being aware of or needing to know the complexity of underlying data organization and storage, without needing to understand, implement, and/or maintain a complex web of join conditions across various sets of underlying data, etc.

In an embodiment, a custom computer language generally enables users of any skill or level with a basic knowledge of a subject area to perform one or more operations or activities associated with an application (e.g., any of applications 312). For example, a custom computer language generally may enable a user to create, update, execute, and/or otherwise implement custom queries, reports, policies, workflows, triggers, and/or other functionality and operations associated with an application. In some embodiments, a custom computer language enables a user to utilize and perform various operations involving organizational data 311. For example, one or more applications associated with an organizational data management system or any other types of applications (e.g., applications 312) generally may provide a custom computer language allowing users to perform operations based on the structure and/or relationships associated with organizational data 311.

In an embodiment, a custom computer language may allow a user to use simplified terms to query organizational data 311. In one example, a custom computer language may allow a user to obtain the name of an employee's manager with the following example query: "ORG(John Smith, Manager)", which may return "Jane Jones" as the manager of the employee. As such, a custom computer language for an application may allow a user to use simplified and familiar terms without needing to understand complex interrelationships between various types of data stored across one or more different databases and/or other types of data stores. Further, a custom computer language generally may be processed by one or more applications (e.g., application(s) 312 associated with an organizational data store) so that users do not have to specify data joins when performing various operations involving organizational data 311.

In an embodiment, a custom computer language is based on and/or otherwise associated with one or more data structures 315 associated with an application. For example, a custom computer language may be based on, represent, describe, or otherwise be associated with an object graph data structure 315 (e.g., a master object graph, any one or more portions of a master object graph, etc.) and/or any other types of data structures 315 that describe the structure of an application and/or the underlying data associated with an application. In an example, a custom computer language is based on the structure of one or more applications and/or associated organizational data 311 of an organizational data management system. For example, the structure of the one or more applications and/or the associated organizational data 311 may be represented and described in one or more data structures 315 including, but not limited to, one or more independent and/or interrelated object graph data structures 315. In various embodiments, an application (e.g., one of application 312) and/or another supporting application used in association with the application can utilize object graph data structures 315 to process and perform various underlying operations associated with custom computer language instructions.

In an embodiment, the computing system 302 includes an application development environment 305 that provides users with access to and/or operations associated with one or more computer languages including, but not limited to, a custom computer language. For example, the application development environment 305 can be associated with one or more applications of an organizational data management system that stores and manages various types of organizational data 311. In an example, application development environment 305 generally may be an application (e.g., application 304) or portion of an application that enables a user to perform various operations involving organizational data 311 of an organizational data management system using a custom computer language. For example, application development environment 305 generally may enable a user to create, update, execute, and/or otherwise implement custom rules associated with triggers, actions performed based on an activation of a trigger, and/or other functionality and operations associated with one or more applications of an organizational data management system.

In various embodiments, any one or more parts of the application development environment 305 may run, for example, on a computing system (e.g., computing system 302) and/or in association with information, applications, and/or services on another computing system (e.g., computing system 310). For example, application development environment 305 may utilize organizational data 311, application(s) 312, application policy data 313, integration data 314, data structures 315, and/or application object data 316 available from another computing system (e.g., computing system 310, one or more computing systems associated with an organizational data management system, etc.). Application development environment 305 also may include a query processing engine (not shown), computer instruction compiler (not shown), computer instruction generator (not shown), and/or other specialized computer software for performing operations associated with providing triggers in a system of record (e.g., based on computer instructions in a custom computer language provided by the system of record). Application development environment 305 also may utilize or work in conjunction with, in whole or in part, cloud development environment 317 and custom language processing engine 318 (including, for example any computer instruction compiler (not shown) and/or computer instruction generator (not shown) associated with custom language processing engine 318), and/or other features and or operations available from another computing system (e.g., computing system 310, one or more computing systems associated with an organizational data management system, etc.).

In an embodiment, application development environment 305 can include a user interface (e.g., an editor) that allows users to enter, define, edit, check, store, schedule, execute, and/or perform any other operations associated with creating, viewing, maintaining, and/or utilizing computer instructions in a custom computer language. In some embodiments, application development environment 305 includes a textual editor that enables users to enter and manipulate computing instructions in a custom computer language. In some examples, a textual editor of the application development environment 305 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the application development environment 305 may be based on and may actively utilize one or more data structures 315 (e.g., an object graph based on organizational data 311) associated with implementation of a custom computer language.

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment status for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect when an employee receives a promotion or a raise, changes to a different department, is added to one or more new teams, is assigned new computer hardware or other equipment, etc.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

In an embodiment, the computing system 306 includes a cloud application development environment 309. For example, the cloud application development environment 309 generally may be a local instance of an online integrated development environment (e.g., a cloud development environment 317) provided by one computing system (e.g., computing system 310) that is accessed from a web browser and/or any other type of application 308 on another computing system (e.g., computing system 306). For example, the cloud application development environment 309 can be associated with one or more applications of an organizational data management system that stores and manages various types of organizational data 311. In an example, cloud application development environment 309 generally may be an application (e.g., application 308) or portion of an application that enables a user to perform various operations involving organizational data 311 of an organizational data management system using a custom computer language. For example, cloud application development environment 309 generally may enable a user to create, update, execute, and/or otherwise implement custom queries, reports, policies, workflows, triggers, rules, group assignments, and/or other functionality and operations associated with one or more applications of an organizational data management system.

In various embodiments, any one or more parts of the cloud application development environment 309 may run, for example, on a computing system (e.g., computing system 306) and/or in association with information, applications, and/or services on another computing system (e.g., computing system 310). For example, cloud application development environment 309 may utilize organizational data 311, application(s) 312, application policy data 313, integration data 314, data structures 315 and/or application object data 316 available from another computing system (e.g., computing system 310, one or more computing systems associated with an organizational data management system, etc.). Cloud application development environment 309 also may include a query processing engine (not shown), computer instruction compiler (not shown), computer instruction generator (not shown), and/or other specialized computer software for performing operations associated with providing triggers in a system of record (e.g., based on computer instructions in a custom computer language provided by the system of record). Cloud application development environment 309 also may utilize or work in conjunction with, in whole or in part, cloud development environment 317 and custom language processing engine 318 (including, for example any computer instruction compiler (not shown) and/or computer instruction generator (not shown) associated with custom language processing engine 318), and/or other features and or operations available from another computing system (e.g., computing system 310, one or more computing systems associated with an organizational data management system, etc.).

In an embodiment, cloud application development environment 309 can include an editor that allows users to enter, define, edit, check, store, schedule, execute, and/or perform any other operations associated with creating, viewing, maintaining, and/or utilizing computer instructions in a custom computer language. In some embodiments, cloud application development environment 309 includes a textual editor that enables users to enter and manipulate computing instructions in a custom computer language. In some examples, a textual editor of the cloud application development environment 309 may assist users with constructing various types of statements in a custom computer language. For example, the textual editor may provide syntax highlighting in a custom computer language, intelligent completion of keywords or statements in a custom computer language, automated hints and examples, various types of pop-up information to assist a user in writing or editing instructions in a custom language, visual notification of syntax or other errors, suggested correction of syntax or other errors, automatic suggestion and/or population of objects and/or functions, etc. In some examples, automation and other assistance provided by a textual editor of the cloud application development environment 309 may be based on and may actively utilize one or more data structures 315 (e.g., an object graph based on organizational data 311) associated with implementation of a custom computer language.

In an embodiment, cloud application development environment 309 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via a drag and drop and/or any other types of graphical user interfaces (e.g., a software wizard or setup assistant user interface that presents a user with a sequence of dialog boxes or other types of interfaces that guide the user through a series of steps in generating one or more portions of an application). Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the cloud application development environment 309 may provide a textual editor in combination with the visual editor to allow users to view, utilize, and alternate between both textual and visual editors of a custom query language, for example, as part of the same user interface.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, and/or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications (e.g., applications owned and controlled by an organization that owns and controls the organizational data 311 and/or applications provided with or as part of an organizational data management system used by the organization as a system of record for maintaining the organizational data 311, etc.) and/or one or more third-party applications are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing systems 302, 306, and 310) and/or applications (e.g., such as applications 304, 308, and 312). For example, the integration data 314 can be used to integrate and synchronize organizational data 311 and/or associated operations across an organizational data management application or system (e.g., a system of record for organization data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, application 308, etc.) that use or perform operations based on the organizational data 311). Such integration data 314 may include, but is not limited to, information indicating and/or describing various data that enables performance of an integration between applications or systems, such as an integration type information (e.g., flat file, application programming interface or "API", webhook, system call, etc.), security information (authentication information, encryption information, etc.) technical information (e.g., file locations, call information, system naming, application naming, IP address information, port information, etc.), integration flow information (e.g., push, pull, bidirectional, etc.), integration activation (e.g., scheduling or timing information, event information, one or more rules, one or more triggers or criteria, etc.), processing information (e.g., data mappings between the source and target, data validation rules, data transformations, error handling, etc.), and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, performing integration and synchronization of the organizational data 311 with one or more different third-party applications and/or systems, generating and processing computer instructions across one or more different systems based on the organizational data 311, etc. In an embodiment, the data structures 315 generally can include information about the properties or attributes of each of one or more entities associated with the organizational data 311. Data structures 315 also can include information describing relationships associated with one or more entities associated with the organizational data 311 (e.g., explicit relationships defined between entities, virtual relationships determined based on various attributes and data associated with entities, etc.). In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating computer instructions, processing computer instructions, generating workflows, executing workflows, generating triggers, evaluating trigger conditions, performing trigger operations, creating reports, running reports, etc.

In an embodiment, the data structures 315 can include one or more object graphs and/or any other types of data structures that provide information about entities, relationships, rules, constraints, and/or any other aspects of managing the organizational data 311. For example, such object graphs can include one or more nodes representing entities associated with the organizational data 311 and one or more edges that connect and represent relationships between the nodes (e.g., explicit edges defining relationships between entities and data, virtual edges inferring relationships between entities and data, etc.). The data structures 315 can also include organizational data and/or associated metadata. In addition, the data structures 315, together or alone, generally may represent one or more structural aspects of an application or system (e.g., such as an organizational data management system that is a system of record for organizational data 311 of an organization). In various examples, the data structures 315 generally may be used to support various operations performed by a system of record including but not limited to performing one or more operations for providing triggers in the system of record. For example, the data structures 315 alone or in combination with configuration data and/or one or more types of information) may be used to generate new instructions in a computer language, which may include a custom computer language provided to users. Further, such new instructions generally may include one or more operations (e.g., one or more underlying data joins) that are identified and included in the generated instructions based on analyzing instructions received in the custom computer language in view of the data structures 315.

The computing system 310 includes the application object data 316, which can be implemented on the computing system 310. For example, the application object data 316 can include any information that is used to implement any type of application object or data structure for an application object that may store, reference, utilize, and/or process data. In an example, a system of record generally may support application objects that include, but are not limited to, application triggers, application reports, application workflows, application tasks, custom objects, and/or any other types of objects.

In an embodiment, application triggers generally may include application objects that are referenced based on an event. For example, an application trigger may be referenced based on one or more internal application or system events (e.g., occurring within a system of record, etc.), based on one or more external application or system events (e.g., occurring outside of a system of record, occurring in a third-party application integrated with a system of record, etc.), or based on a combination of one or more internal application or system events and one or more external application or system events.

Generally, an application trigger may include one or more conditions to be evaluated when the application trigger is referenced by an application or system. For example, such conditions may include, but are not limited to, conditional statements that test one or more aspects of organizational data 311. In one example, when the application trigger is referenced and the conditions of the application trigger are satisfied (e.g., evaluate to true), then one or more operations associated with the trigger are automatically executed. For example, the one or more operations associated with the application trigger may cause an application or system to perform one or more operations internally, may cause the application or system to perform one or more operations in association with an external application or system (e.g., based on an integration, etc.), or may cause the application or system to perform one or more operations internally and to perform one or more operations with an external application or system.

In an embodiment, application reports generally may include any computer instructions that are executed by an application or system to obtain a collection of data or the resulting collection of data. Application workflows generally may refer to an object or objects that define a sequence of steps for automating a process associated with an application or system. Application tasks generally may be objects that are used to define one or more actions or pieces of work to be performed by a user or group of users. Application tasks may be assigned or delegated to one or more users or groups of users. Application tasks also may include information related to a particular task (e.g., start date, due date, etc.). Applications and systems may allow a user of an organization to create custom objects, which may define one or more custom object attributes, custom object operations, and relationships with entities provided by an application or system and/or other custom objects defined for an organization.

The computing system 310 includes the cloud development environment 317, which can be implemented on the computing system 310, for example, to provide users with access to an environment for writing, building, testing, executing, and/or performing any other types of operations involving instructions in a custom computer language. In an embodiment, the cloud development environment 317 may include and/or perform operations associated with the custom language processing engine 318 and, for example, any computer instruction compiler (not shown) and/or any computer instruction generator (not shown) associated with custom language processing engine 318. In addition, the cloud development environment 317 may run on one computing system (e.g., computing system 310) and provide one or more services to applications running on another computing system (e.g., application development environment 305 on computing system 302, cloud application development environment 309 on computing system 306, etc.). Further, the cloud development environment 317 may perform any one or more of the operations previously described with respect to application development environment 305 and/or cloud application development environment 309. Similarly, application development environment 305 and/or cloud application development environment 309 may perform any one or more of the operations described in association with cloud development environment 317.

The computing system 310 includes the custom language processing engine 318, which can be implemented on the computing system 310 and used to perform operations associated with processing requests based on instructions in a custom computer language. In various embodiments, the custom language processing engine 318 may receive requests for processing that include one or more instructions in a custom computer language. For example, such requests may be received from one or more different computing systems (e.g., computing system 302, computing system 306, computing system 310, etc.) and/or one or more different applications (e.g., application 304, application development environment 305, application 308, cloud application development environment 309, application(s) 312, cloud development environment 317, etc.). Custom language processing engine 318 may be associated with or utilize one or more computer instruction compilers (not shown) and/or one or more computer instruction generators (not shown), which for example, may be separate, part of, or integrated with the custom language processing engine 318.

In an embodiment, a computer instruction compiler of the custom language processing engine 318, can be implemented on the computing system 310 and used to perform operations associated with analyzing instructions in a custom computer language including, but not limited to, parsing and analyzing custom computer language instructions based on one or more rules associated with a custom computer language and/or associated data structures 315, for example, to determine whether any error exists in the custom computer language instructions, to identify one or more errors in the custom computer language instructions, to return information about one or more of the identified errors, to determine when the custom computer language instructions are free from error, etc. The computer instruction compiler of the custom language processing engine 318 may include or be associated with a computer instruction generator (not shown) that generates one or more new instructions in a computer language, such as a custom computer language.

In an embodiment, a computer instruction generator of the custom language processing engine 318, can be implemented on the computing system 310 and used to generate one or more new instructions in a custom computer language. For example, the computer instruction generator may generate instructions in a custom computer language for execution based on configuration of one or more application objects and/or data associated with such application objects (e.g., application triggers, application reports, application workflows, application tasks, custom objects, etc.). In one example, such instructions in the custom computer language may be executed by an application of a system of record to perform one or more operations involving the system of record and/or any third-party application integrated with the system of record. In one example, the computer instruction generator may generate instructions in any computer language, for example, to be executed in association with any application or computing system. For example, the computer instruction generator may generate instructions in a different computer language for execution with one or more other applications 312 or data stores (not shown) on or associated with computing system 310 and/or one or more other applications (e.g., application 304, application 308, third-party application 330, third-party application 332, third-party application 334) associated with other computing systems (e.g., computing system 302, computing system 306, computing system 320, computing system 322, computing system 324).

In various examples, third-party applications (e.g., third-party application 330, third-party application 332, third-party application 334) generally may be any type of computer application referenced within the present disclosure or otherwise available. In some examples, each third-party application may be associated with a respective computing system (e.g., computing system 320, computing system 322, computing system 324). In some examples, each third-party application may be associated with one or more different computing systems. In some examples, multiple third-party applications may run on each of one or more different computing systems.

In an embodiment, an application store computing system (not shown) provides an organization with access to multiple different integration applications (not shown) for integrating organizational data 311 and/or associated processes with and across various different applications and/or systems (e.g., application(s) 312, third-party application 330, third-party application 332, third-party application 334, etc.). An application store computing system also may provide an organization with one or more other types of applications, including but not limited to, platform utility apps that provide additional functionality to an organizational data management application or system, other apps that may include integration-related applications, and/or any other types of applications. Generally, the application store computing system may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment the application store computing system is managed and provided by the same party that provides an organizational data management system to organizations. For example, the integration applications provided by the application store computing system generally may be specialized for use with the organizational data management system (e.g., and not end-user versions of applications that would be installed for general purpose use by end-users on end-user devices or for use by end-users via cloud services or any other types of services).

In an embodiment, the integration applications generally can be any application that allows an organization to manage any one or more aspects associated with providing one or more corresponding end-user applications to individual members (e.g., employees), teams, roles, departments, and/or any other grouping or categorization of individuals in an organization. For example, each of the integration applications can be used by an organization to control and automate various tasks associated with provisioning, configuring, maintaining, and integrating third-party applications. In some embodiments, one or more of the integration applications can allow an organization to configure automated assignment of a corresponding end-user application to one or more individuals, user account creation, single sign-on setup, provisioning, installation, setup, and/or maintenance of corresponding end-user applications (e.g., third-party applications or other applications available for use by end users) provided to particular individuals, groups, and/or one or more devices associated with such individuals or groups in the organization (e.g., via installation on respective user devices, via a cloud application service available to end users, etc.).

In an embodiment, one or more of the integration applications can provide integration of organizational data 311 and associated services with one or more corresponding third-party applications (e.g., application 304 on computing system 302, application 308 on computing system 306, application(s) 312 on computing system 310, third-party application 330 on computing system 320, third-party application 332 on computing system 322, third-party application 334 on computing system 324, etc.) that utilize and/or perform operations based on organizational data 311. For example, each of the integration applications can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications and/or other applications provided by the application store computing system may include, but are not limited to, collaboration apps, support apps, design apps, development apps, finance and legal apps, human resources (HR) and benefits apps, information technology (IT), device management, and security apps, office management apps, sales and marketing apps, charitable apps, platform utility apps, and/or other apps. Generally, various different types of applications provided by the application computing system may be organized, categorized, grouped, presented, and/or otherwise offered in any type of arrangement, and thus are not limited to any particular examples discussed herein, which are provided for illustration purposes only.

In an embodiment, collaboration apps may include, for example, any applications that provide scheduling, communications, document sharing and management, electronic signature services, project management, productivity, and/or any other types of applications that facilitate work between individuals, groups, and/or parties.

In an embodiment, support apps may include, for example, any applications that provide services associated with customer support, technical support, issue reporting, issue management and escalation, tracking and managing help desk tickets, and/or any other types of applications that facilitate customer, business, and/or technology support.

In an embodiment, design apps may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications and/or systems used to manage various aspects of an organization.

In an embodiment, human resources (HR) and benefits apps may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps may include, for example, any applications that provide services associated with device management, technology, information security, password management, and/or any activities associated with managing applications, systems, devices, or associated technology.

In an embodiment, office management apps may include, for example, any applications that provide services associated with facilities management, receptionist services, physical access, visitor access, catering services, office layout, office assignments, and or any other types of applications or systems associated with performing office management.

In an embodiment, sales and marketing apps may include, for example, any applications that provide services associated with social media, analytics, advertising, event management, customer relationship management, content creation and distribution, public relations, business generation, campaign management, and/or any other types of similar or related activities.

In an embodiment, charitable apps may include, for example, any applications that provide services associated with donations, charitable giving, crowdfunding, etc.

In an embodiment, platform utility apps may include, for example, any applications from a provider that allow an organization to utilize software applications, systems, or services that have been purchased or that are otherwise available from the provider. For example, a provider of an organizational data management system can allow an organization to access and utilize standard services and/or enhanced services via one or more of the platform utility apps. In some embodiments, the platform utility apps operate from and/or are directly integrated with applications, systems, and/or services obtained from a provider. For example, such platform utility apps can allow one or more users of an organization to customize a particular implementation or instance of provider software that is associated with the organization. In one example, one of the platform utility apps can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflows, triggers, tasks, reports, integrations, etc. In some embodiments, users may create and modify custom fields, relationships, rules, tables, entities, and any other various aspects of an organizational data management system in a utility application or otherwise using a custom computer language provided by the organizational data management system.

In an embodiment, other apps may include, for example, any types of applications that may be used by individuals and/or organizations. The other apps may include, for example, any other category of integration applications and/or any other types of applications that can be executed by a computing system or device.

In an embodiment, authorized users of an organization with the appropriate privileges may access one or more services of the application store computing system directly, for example, via a website, web page, desktop application, mobile application, and/or any other type of application to browse, view, search, compare, evaluate, download, install, configure, upgrade, uninstall, and/or perform any other types of activities associated with the integration applications or any other types of applications provided via the application store computing system. In some embodiments, authorized users of an organization with the appropriate privileges may access one or more services of the application store computing system indirectly, for example, through another application (e.g., application 312) and/or another computing system (e.g., computing system 310). In some embodiments, the application store computing system can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications for use by the organization. For example, any such user with the appropriate privileges may install one or more of the integration applications for the organization on the computing system 310 or any other computing systems or devices. Also, any such user with the appropriate privileges may configure integration data 314 associated with each of one or more integration applications. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize, that perform processing involving or based on, and/or that are otherwise associated with organizational data 311. The organizational data management system also can automate various processing based on the organizational data 311 including, but not limited to the automation of processing performed across various third-party applications based on the organizational data 311. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example, to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party applications 330, 332, 334) that generate, utilize, process, and/or perform activities based on organizational data 311. Such integration generally allows an organizational data management system to orchestrate and automate processing of organizational data 311 and associated activities across numerous different applications that are not in communication or coordination with one another. In some embodiments, an organizational data management system can allow appropriate users (e.g., authenticated, authorized, privileged, etc.) of an organization to, for example, manage organization information, settings of an organizational data management system, onboarding of employees, offboarding of employees, employee information, organizational structure and locations, employee placement in departments and teams, workflows and tasks, reports, documents, and/or any other information associated with organizational data 311.

In an embodiment, an organization uses an organizational data management system that allows the organization to manage organizational data 311 and activities performed based on the organizational data 311. In some embodiments, an organization can install and use an organizational data management system on a computing system (e.g., computing system 310 or any other computing system) that is dedicated to the organization. Also, an organizational data management system can comprise any one or more of organizational data 311, application(s) 312, application policy data 313, integration data 314, data structures 315, application object data 316, cloud development environment 317, custom language processing engine 318, and/or any other information associated with managing, processing, and performing activities associated with organizational data 311. In addition, an organizational data management system may provide and utilize its own custom computer language that allows business users to access and perform various operations using simplified computer instructions based on structure of organizational data 311. Further, an organizational data management system may provide various features and user interfaces to configure and to automate the execution of triggers in the custom computer language to perform various activities within the organizational data management system and across one or more other applications (e.g., third-party application 330, third-party application 332, third-party application 334) running on one or more different computing systems (e.g., computing system 320, computing system 322, computing system 324).

In an embodiment, an organizational data management system may be provided by another party for use by an organization. For example, another party such as a software application provider may host or otherwise provide a separate instance of an organizational data management system to each of one or more different organizations allowing each organization to independently manage their own organizational data 311. In such embodiments, each separate instance of an organizational data management system provided to an organization can respectively comprise any one or more of organizational data 311, application(s) 312, application policy data 313, integration data 314, data structures 315, application object data 316, and/or any other information associated with managing, processing, and performing activities associated with organizational data 311 for the particular organization. As such, an organizational data management system may be a cloud-based platform that maintains organizational data 311 and other information associated with each of one or more different organizations and that allows each of the different organizations to independently manage their own respective organizational data 311 and related processes independently from any other organization.

Figure 4:
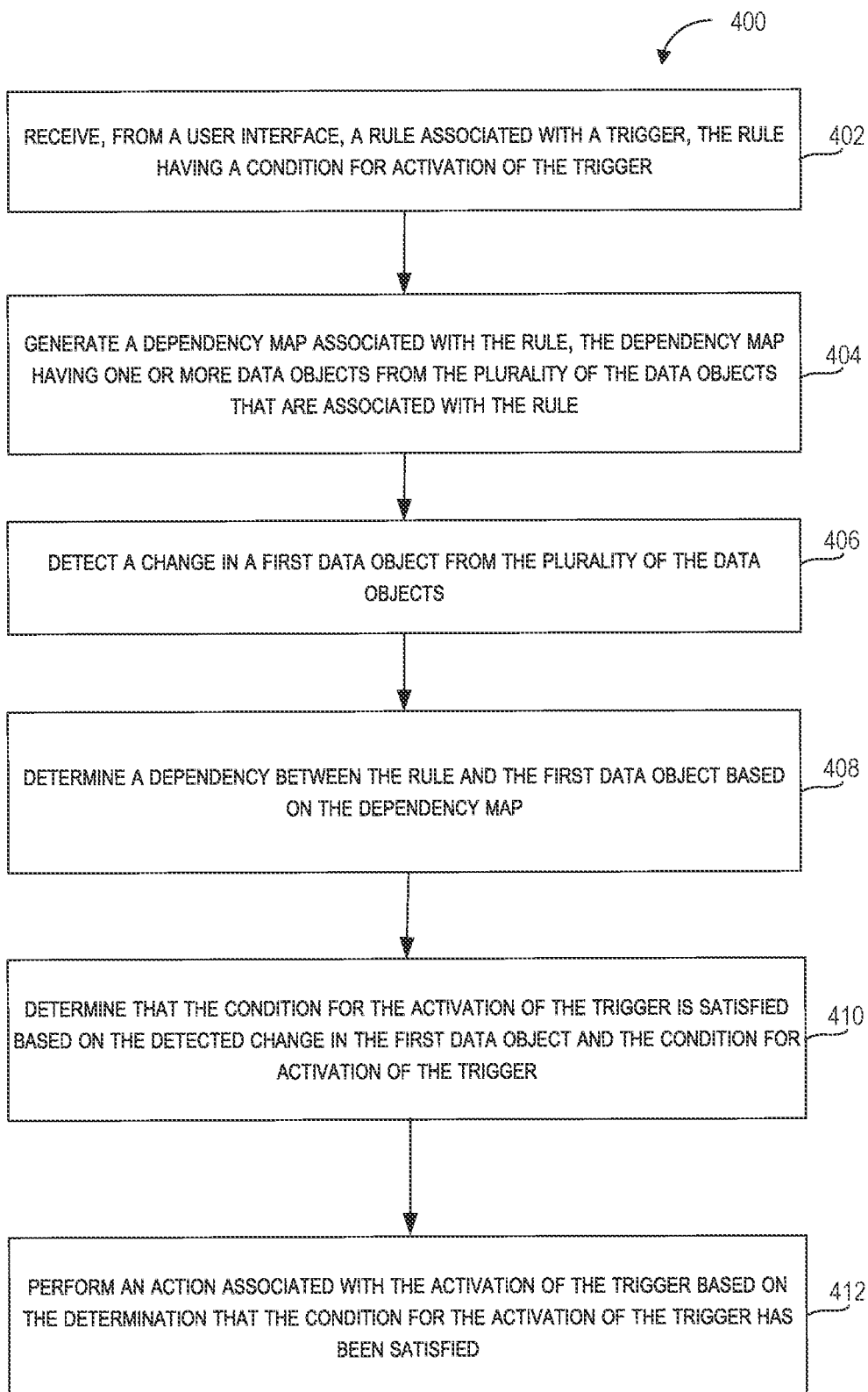
FIG. 4 depicts a flow diagram of an example method for performing an action in response to a trigger rule in a system of record that manages organizational data, according to example embodiments of the present disclosure.

FIG. 4 depicts a flow diagram of an example method 400 for performing actions specified by a rule in an organizational management platform, according to example embodiments of the present disclosure. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

According to some embodiments, the computing system of method 400 can implement an organizational management platform to manage applications (e.g., application 304, application 308) for an organization. The computing system can include one or more databases (e.g., one or more memory devices 116, one or more memory devices 136, one or more memory device 156, one or more memory devices 202) that collectively store organizational data (e.g., data 118, data 138, data 158, organizational data 203, organizational data 311) associated with the organization. The organizational data can include an object graph data structure comprising a plurality of data objects associated with the organizational data.

At 402, the computer system can receive a rule associated with a trigger. The rule can include a condition for activation of the trigger. The rule can be received from a user interface, such as a graphical user interface. In some instances, the user interface can present a plurality of rules for a user to select. The selection of the rule from the plurality of rules can be received from a user input of the user. Additionally, the user interface can present a plurality of actions to be performed for each rule when a trigger associated with the rule is activated. In some examples, a user can select, using the user interface, a rule associated with a trigger, and then select an action based on the activation of the trigger. The rule associated with the trigger and the condition for activation of the trigger can be stored as rule data 204.

In one example, a user can select a rule that will send an alert to a manager of an employee if the employee is on pace to be working more than 40 hours in a current week. In this example, the action performed by the computer system includes sending the alert to the manager, and the trigger associated with the rule is the determination whether the employee is on pace to be working more than 40 hours in the current week. Continuing with this example, the computing system can determine that the employee is expected to work eight hours on Friday and the employee has already worked more than 32 hours this current week. The computing system can send an alert to the manager of the employee when the employee has already worked 32 hours.

In some embodiments, the computer system may provide one or more types of user interfaces that allow users of an organization to configure rules and triggers associated with an application. For example, the computer system may provide any one or more different types of command line interfaces, editor interfaces, graphical user interfaces, and/or wizard user interfaces (e.g., alone or in combination) that allow users to write, create, edit, modify, submit, test, store, deploy, disable, enable, execute and/or perform any other actions to create and utilize rules and triggers associated with an application.

In some embodiments, the computer system provides graphical user interfaces that enable a user to configure various aspects of the rules and triggers received at 402. For example, one or more graphical user interfaces may enable a user to configure conditions and operations associated with a rule and respective triggers associated with the rule. A graphical user interface may generate instructions for a rule or a trigger in a computer language, such as a custom computer language for managing organizational data 311. Such generated instructions then may be utilized by an organizational data management system that supports the custom computer language to implement the rules and triggers.

In some embodiments, a trigger generally may be described as a data object in the object graph data structure that performs one or more actions in response to or based on an event, a condition, or a combination of an event and a condition. As an example, a trigger may perform one or more operations based on a change to one or more data fields. A trigger also may perform one or more operations when a set of conditions associated with the trigger are satisfied. A trigger also may perform one or more operations, for example, based on evaluating conditions of a trigger in response to an event and determining that the conditions associated with a trigger are satisfied. In various examples, when the conditions of a trigger are satisfied, then the trigger is activated, causing one or more operations associated with the trigger to be executed.

At 404, the computer system can generate a dependency map 209 associated with the rule. The dependency map 209 can have one or more dependent data objects from the plurality of data objects that are associated with the rule. The dependency map 209 once generated can be stored in the data structures 208. The dependency map 209 associated with the rule can include information (e.g., trigger, condition for activation of the rule) associated with the rule, one or more relationships involving one or more of the entities (e.g., objects, records) and the rule, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The dependency map 209 can include object data associated with, but not limited to, individuals (e.g., employees, vendors, independent contractors), departments, teams, roles, groups, locations, offices, documents, tasks, reports, accounts, devices, applications, end-user applications, licenses, workflows, alerts, time information, attendance information and/or any other types of entities representing or related to managing organizational data (e.g., organizational data 203).

The dependency map 209 also can define various relationships among the various entities associated with rule. For example, the dependency map 209 may define relationships such as an employee being assigned to a department, a team, a primary location, a secondary location, a computing device, and any other relationships provided by the organizational data 203.

The dependency map 209 can include object graphs (e.g., based on an object graph data model) providing information about entities, relationships, and/or any other aspects relating to the definition, structure, and rules associated with organizational data (e.g., organizational data 203). The dependency map 209 also can include any one or more other types of data structures (e.g., with or without the use of object graphs) that provide information about entities, entity attributes, entity attribute categories, relationships, and/or any other aspects of the definition, structure, and/or rules associated with organizational data.

In some instances, a dependency map 209 generated by the computing system 110 can be part of the data structures 208. The dependency map 209 can define various relationships among the various entities (e.g., data object) and the rule received by the computing system 110. The relationships can be defined by the computing system 110 based on the object graphs and the application object data 210.

At 406, the computer system can detect a change in a first data object from the plurality of data objects. In some instances, the first data object can be associated with the employee records of a first employee in the organization. The plurality of data objects can be the employee records of each employee in the organization. The employee records can include metadata (e.g., attributes) associated with the employee. The computer system can detect a change in the employer record of the first employee when the metadata changes. For example, a computing system can maintain data objects associated with an employee. The computer system can detect a change in the data object associated with the first employee when the first employee clocks into work or when the first employee increases the amount of time worked by a certain amount.

In some instances, the change in the first data object detected at 406 can include a change to respective values associated with one or more attributes of an entity in organizational data 311, or a change to one or more values associated with a formula or other type of calculation associated with organizational data 311. For example, any change to organizational data 311 may initiate a determination at 408 and 410 to determine whether such change is associated with and/or affects a dependency existing in the organizational data 311. In one example, an application may reference one or more data structures 315 (e.g., an object graph) associated with an application based on a modification to organizational data 311 to determine one or more dependencies in the organizational data 311 to be updated based on the modification. For example, an update to an attribute value may be used to identify and update other dependent attributes, custom fields, and formulas associated with the updated attribute.

In some instances, the change in the first data object detected at 406 may include any user-generated change (e.g., event), such as a command or action taken by a user to generate the change. Additionally, a detected change of the first data object can include a scheduled event that runs at a particular time or at one or more recurring times. For example, a system may periodically determine whether to evaluate a group of one or more triggers based on scheduling information. In one example, evaluation of a certain group of one or more triggers may be initiated based on a date change. Moreover, the detected change of the first data object can also include an internal change that occurs in an application. For example, internal change associated with an application may include, but are not limited to, progression of a task, completion of a task, assignment of a task, update of a task status, the evaluation of another trigger, the firing of another trigger, approval of a request, denial of a request, generation of one or more alerts, transmission of one or more alerts, generation of one or more messages, transmission of one or more messages, any update(s) to organizational data 311, and/or any other type of internal event associated with an application.

At 408, the computer system can determine a dependency between the rule and the first data object based on the dependency map. The dependency map generated at 404 includes one or more data objects from the plurality of data objects that are associated with the rule. For example, it is determined that a dependency between the rule and the first data object exists when the one or more data objects includes the first data object. In some instances, the dependency between the rule and the first data object can be further based on the condition for activation of the trigger.

In some instances, once the computer system detects a change in the first object data at 406, then an application (e.g., time and attendance application) associated with a system of record may analyze the detected change and identify one or more triggers associated with the rule to determine a dependency between the rule and the first data object. The analysis can be based on the dependency map generated at 404. For example, the application may analyze a source of the detected change, nature of the detected change, information associated with the detected change, organizational data 311 in the system of record, application policy data 313, integration data 314, data structures 315, application object data 316, and/or any other information that may be available to determine a dependency between the rule and the first data object. The application may determine one or more triggers associated with the rule to be dependent on the detected change. Also, the application may determine whether to evaluate conditions associated with activation of the trigger based on analyzing available information associated with the detected change. The application can identify one or more triggers to run based on the change detected at 406, causing a determination at 410 of the conditions associated with the activation of the trigger.

At 410, the computer system can determine that the condition for the activation of the trigger has been satisfied based on the detected change in the first data object. In some instances, the dependency between the rule and the first data object can be further based on the condition for activation of the trigger. For example, if the condition for the activation of the trigger is that the trigger can only be activated during the workweek and it is not the workweek, then the condition is not satisfied. Alternatively, if the condition for activation of the trigger is that the value associated with the first data object exceeds a threshold value, and the detected change in the first data object does exceed the threshold value, then the condition is satisfied.

In some instances, the computer system can evaluate one or more conditions for activation of the trigger. The computer system can evaluate a set of one or more conditions of the trigger based on the change in the first data object detected at 406. For example, a trigger may be run based on an event by initiating evaluation of one or more conditions associated with the trigger. The trigger may be a data object associated with corresponding application object data 316 where the trigger is enabled for use with the time and attendance application. The trigger may also be a data object associated with corresponding data structures 315. Conditions of a trigger can include one or more conditions that can be evaluated to determine a result. For example, a trigger condition may be expressed as a single expression, which in some examples may include one expression or any number of expressions that are connected or joined using logical operators including, but not limited to "and" and "or" operators. A trigger condition also may be expressed as a combination of multiple, separate expressions that each are evaluated individually and then in combination based on a result of each individual evaluation. As an example, five separate conditions associated with a trigger may be evaluated individually to determine an overall result for the group of conditions. Conditions of a trigger also may be organized or grouped in any fashion. In various examples, trigger conditions can be based on any one or more aspects of organizational data 311 or other information maintained by a system of record and/or based on any one or more aspects of organizational data 311 or other information associated with any application (e.g., any third-party application).

At 412, the computer system can perform an action associated with the activation of the trigger based on the determination that the condition for the activation of the trigger has been satisfied. In some instances, the action performed at 412 can include an alert that is transmitted to a user device of a user (e.g., employee, manager of organization). For example, the alert can be transmitted by computing system 110 to remote computing system 130 or one or more computing device 152. In another example, the alert can be transmitted by computing system 302 to computing system 306, 320, 322, or 324. The alert can be presented on application 308 of the computing system 306. In response to receiving the alert, the user can input a response on a user interface of the computing system 306.

In some instances, the action performed at 412 can include transmitting instructions to a third-party application (e.g., third-party application 330, 332, 334) to execute an operation associated with the transmitted instructions. For example, application 304 (e.g., time and attendance application) can transmit instructions to third-party application 330 (e.g., payroll application) to increase the compensation of an employee associated with the first data object because it is determined that the employee worked overtime during the current pay period.

In some instances, the action performed at 412 can include generating, using the machine-learned predictive model, a second trigger based on the rule received at 402. The computing system 302 can perform an action (e.g., an action similar to the action performed at 412) at a time in the future if the second trigger is activated. The second trigger being associated with a second set of conditions for activation of the second trigger. For example, a manager of a department may want to keep the overall labor cost of the department below a certain threshold. The application 304 can, using the predictive model, alert the manager prior to the threshold being exceeded, and can also alert the manager in real-time when the threshold is exceeded. The time and attendance application allows for tasks (e.g., alerts, approvals) to be automated in real-time while users (e.g., employee, manager) are working.

In some instances, the action performed at 412 can include updating organizational data 311 in a system of record, performing one or more operations in a system of record based on organizational data 311, updating or causing the updating of organizational data 311 in one or more applications external to a system of record (e.g., third-party applications) based on organizational data 311, and or performing or causing the performing of one or more operations in one or more applications external to a system of record based on organizational data 311.

At 408, a computer system determines whether the conditions of the trigger are satisfied. In an embodiment, a computer system evaluates one or more conditions in a set of one or more conditions associated with a trigger to determine a result indicating whether the set of conditions associated with the trigger is satisfied (e.g., evaluates to true, evaluates to a value, meets a certain threshold, exceeds a certain threshold, etc.). For example, an application may evaluate conditions associated with a trigger in response to an event to determine whether to activate or "fire" the trigger by executing operations associated with the trigger.

In an embodiment, an application evaluates conditions associated with a trigger, determines that the conditions of the trigger are satisfied, and causes activation of the trigger to execute operations configured for the trigger. In some examples, the application determines that at least one of the conditions of a trigger are not satisfied. In one example, activation of a trigger does not occur when at least one of the conditions of a trigger are not satisfied. As such, the application would not execute operations of the trigger because the trigger was not activated.

At 410, a computer system executes one or more operations of the trigger in a custom computer language when the conditions of the trigger are satisfied. In an embodiment, one or more operations are configured for execution of a trigger based on activation of the trigger. For example, an application that evaluates conditions of a trigger and determines that the conditions of the trigger are satisfied then may execute operations associated with the trigger based on activation or "firing" of the trigger. In various examples, operations associated with a trigger may be expressed in a custom computer language for processing organizational data 311 where the custom computer language is supported by the application.

In an embodiment, an application executes one or more operations of a trigger. For example, the application may be associated with an organizational data management system that serves as a system of record for organizational data 311. Further, the operations of the trigger may be expressed in or otherwise based on a custom computer language supported by the application. In some examples, the application performs one or more updates to organizational data 311 based on executing one or more operations associated with the trigger. For example, the application may update one or more entities, attribute values, custom fields, formulas, and/or any other information associated with organizational data 311.

In an embodiment, the application performs one or more actions, for example in view of organizational data 311, based on executing one or more operations associated with the trigger. For example, such actions may include, but are not limited to, advancing progression of a workflow, completing a workflow, assigning a task, updating status of a task, completing a task, initiating evaluation of another trigger, firing another trigger, approval of a request, denial of a request, generation of one or more alerts, transmission of one or more alerts, generation of one or more messages, transmission of one or more messages, and/or performing any other types of actions associated with the application.

In an embodiment, the application performs one or more actions involving one or more other applications (e.g., third-party applications), for example in view of organizational data 311, based on executing one or more operations associated with the trigger. For example, the application may use integration data 314 to perform one or more operations that involve separate, third-party applications. The application also can initiate one or more updates to organizational data 311 stored, utilized, and/or otherwise associated with any one or more different third-party applications. Further, in various examples, an application may perform any of the noted actions and/or any other actions in any combination based on executing operations associated with the trigger.

According to some embodiments, the computing system can have a predictive trigger, which allows for an action (e.g., alert) to be performed prior to an event (e.g., employee working overtime in a pay period) occurring. Additionally, the application can use a machine-learned reactionary predictive model to determine whether an event in the future will occur. Moreover, the reactionary predictive model can be further trained based on the dependency map, the conditions for activating a trigger, the determination on whether an event in the future will occur based on the conditions, and whether the event in the future did occur. For example, the time and attendance application can include a predictive trigger. The predictive trigger can be associated with a timeline marker. The timeline marker for a predictive trigger can be associated with a first condition, and a second condition at a certain time after the first condition has been met. The system can create a predictive alert in the future based on projecting the current status forward. For example, if the current status continues (e.g., employee keeps working) at a certain time in the future, then an action is performed (alert is presented to a user). Alternatively, if the current status does not continue (e.g., employee stops working) at a certain time in the future, then the action is canceled.

Figure 5:
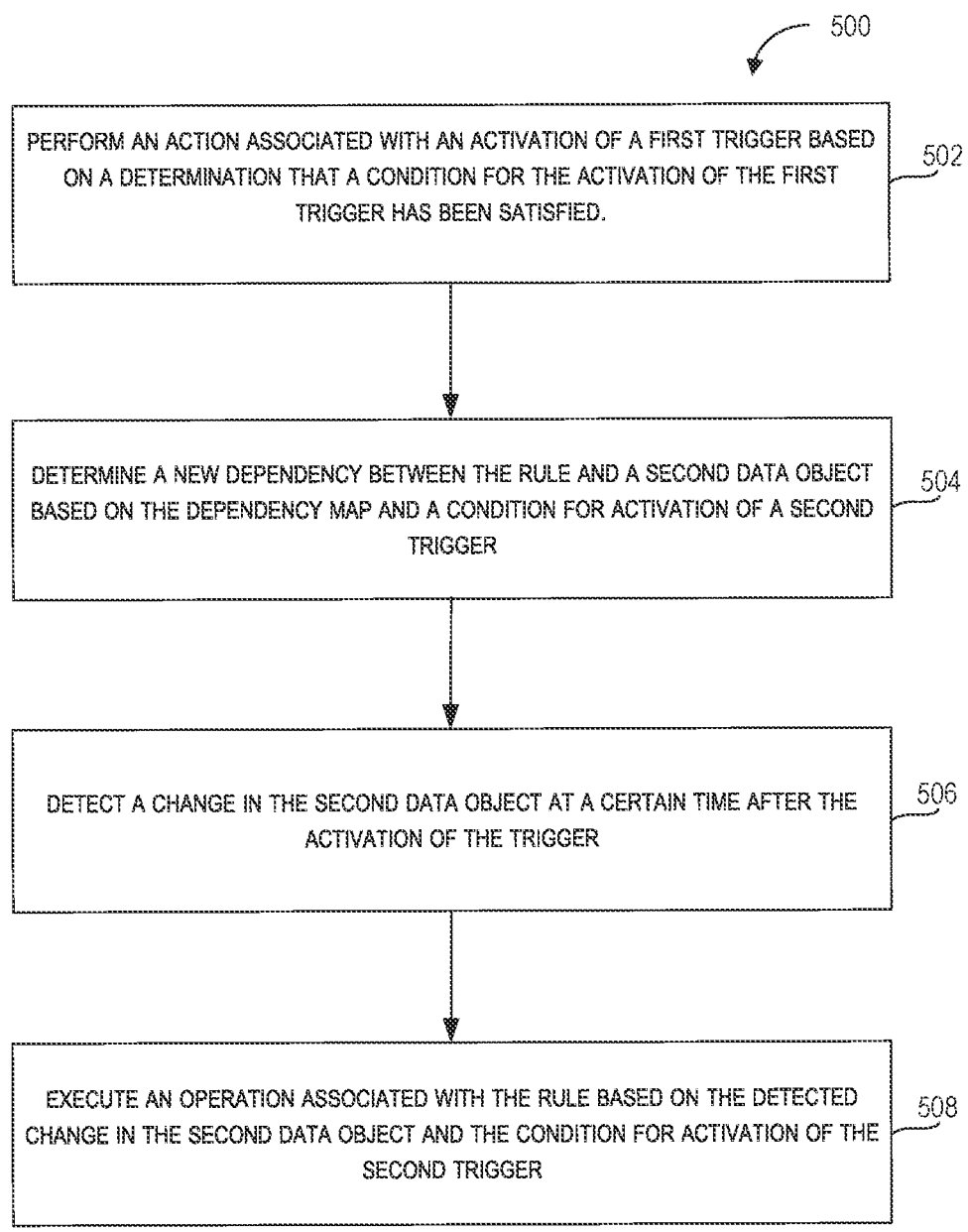
FIG. 5 depicts a flow diagram of an example method for configuration of predictive triggers using a timeline marker, according to example embodiments of the present disclosure.

FIG. 5 depicts a flow diagram of an example method 500 for providing configuration of predictive triggers using a timeline marker, according to example embodiments of the present disclosure. One or more portions of the method 500 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 500 can be executed or implemented as an algorithm on the hardware devices or systems disclosed herein. FIG. 5 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

In some instances, the computing system can include a predictive trigger. The predictive trigger can be associated with a timeline marker. The timeline marker for a predictive trigger can be associated with a first condition, and a second condition at a certain time after the first condition has been met. The system can create a predictive alert in the future based on projecting the current status forward. For example, if the current status continues (e.g., employee keeps working) at a certain time in the future, then an action is performed (alert is presented to a user). Alternatively, if the current status does not continue (e.g., employee stops working) at a certain time in the future, then the action is canceled.

At 502, a computer system can perform an action associated with an activation of a first trigger based on a determination that a condition for the activation of the first trigger has been satisfied. The determination performed at 502 can be similar to the techniques described in the determination process at 410. The action performed at 502 can be similar to the techniques described in the action performed at 412.

At 504, in response to the action performed at 502, the computing system can determine a new dependency between the rule received at 402 and a second data object based on a dependency map and a condition for activation of the second trigger. The condition for activation of the second trigger can be received with the rule at 402. For example, when the rule is received at 402, the rule can include a condition for activation of the trigger and a condition for activation of a second trigger.

For example, the time and attendance application can use a machine-learned predictive model to determine whether an event in the future will occur. The predictive model can determine the condition for the second trigger. Moreover, the predictive model can be further trained based on the dependency map, the conditions for activating a trigger, the determination on whether an event in the future will occur based on the conditions, and whether the event in the future did occur.

At 506, the computing system can detect a change in the second data object at a certain time after the activation of the trigger. The techniques used to detect a change in the second data object at 506 can use similar techniques as described in the change detected at 406.

At 508, the computing system can execute an operation associated with the rule based on the detected change in the second data object. In one embodiment, the rule received at 402 can include information associated with a second trigger and the condition for activation of the second trigger. When the rule received at 402 includes the condition for activation of the second trigger, then the operation executed at 508 can further be based on the condition for activation of the second trigger. In some instances, the operation executed at 508 can be performed at least in part on the organizational data associated with the organization.

For example, the rule can be that airplane pilots cannot work a certain number of hours in a week. Therefore, the condition with this rule can be to activate an alert when the pilot is expected to exceed a certain number of hours worked in a week. The custom rules can provide alerts in real-time and can provide predictive alerts, which can be critical given the rules and regulations associated with a specific industry. For example, the condition for activation of the first trigger can be whether the pilot worked longer than expected hours (e.g., first flight was delayed). The condition for activation of the second trigger can be whether the pilot is expected to fly again tomorrow in a second flight, which could result in the pilot exceeding a certain number of hours in a week. In this example, the operation executed at 508 can include sending a predictive alert prior to the second flight.

In another example, the time and attendance application can be synchronized with third-party applications (e.g., payroll) associated with the organizational management platform. For example, the condition for the first trigger can be satisfied when the employee has worked overtime based on the rules received from the user interface. The condition for the second trigger can be satisfied when approval is received from a manager to compensate the employee for the overtime. When the second trigger has been satisfied, the operation executed at 508 can include automatically updating the number of hours worked in the third-party application (e.g., payroll application) so that the employee is automatically compensated for the overtime.

Figure 6:
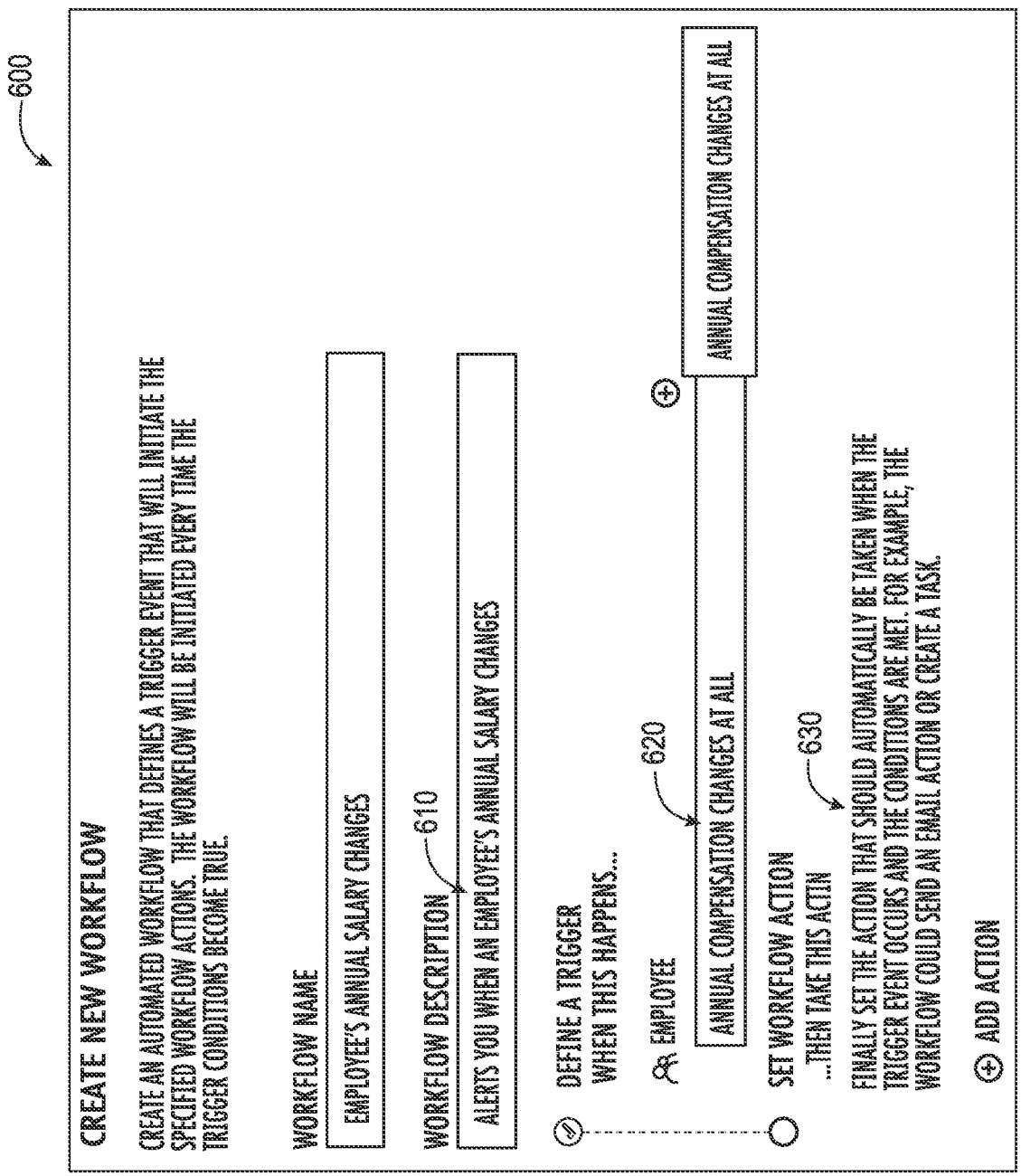
FIG. 6 depicts an illustration of an example user interface for configuring a rule associated with a trigger, according to example embodiments of the present disclosure.

As an example, FIG. 6 depicts an illustration of an example user interface 600 for configuring a rule and a trigger associated with the rule, according to example embodiments of the present disclosure. The example user interface 600 generally allows a user to create a rule 610 and to configure a trigger 620 associated with the rule. For example, the example user interface 600 allows a user to define a condition for the trigger 620 and an action 630 to be performed when the trigger is activated. In the example user interface 600, a user is creating a rule 610 that will perform an action 630 (e.g., such as providing an alert) when the condition for activating the trigger 620 (e.g., an employee's annual salary changes) is satisfied.

Such user interfaces generally may allow users to configure rules and triggers based on any one or more of entity information (e.g., an employee entity), attribute information (e.g., attributes of an employee entity), one or more relationships between entities (e.g., employees may have one or more devices), associated entity information (e.g., a device assigned to an employee), associate entity attribute information (e.g., a model of a device assigned to an employee, a version of software running on a device assigned to an employee, etc.), and operations available from the system of record (e.g., ping a device assigned to an employee, install a particular application on a device assigned to an employee, install a patch for an operating system running on a device assigned to an employee, etc.) and/or based on any one or more of entity information, attribute information, and operations available from any one or more third-party applications integrated with the system of record.

Figure 7:
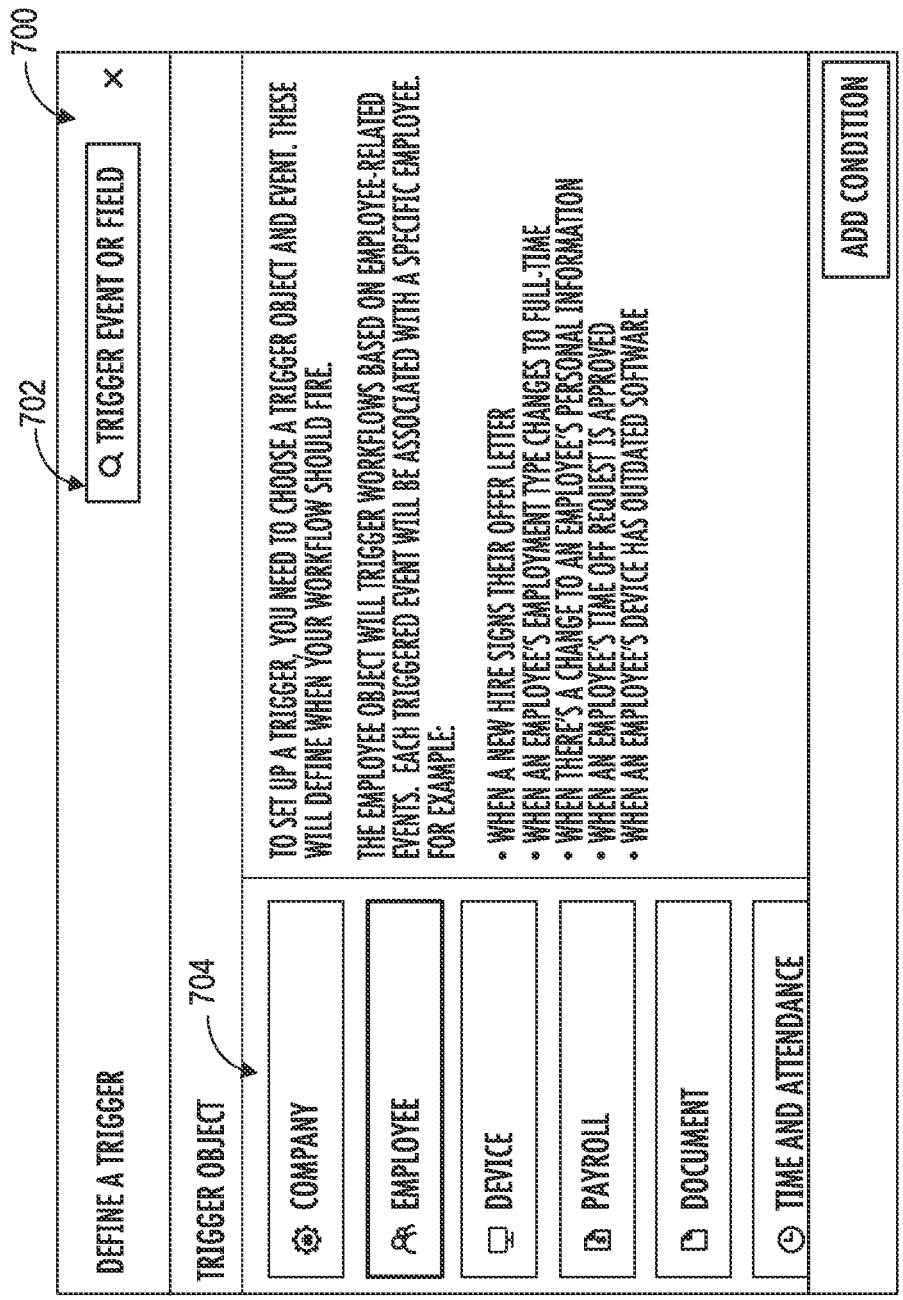
FIG. 7 depicts an illustration of an example user interface for selecting a trigger object when configuring a trigger associated with a rule, according to example embodiments of the present disclosure.

As an example, FIG. 7 depicts an illustration of an example user interface 700 for selecting a trigger object when configuring a trigger associated with rule, according to example embodiments of the present disclosure. In example user interface 700, a search interface 702 is provided to enable a user to search for one or more of available trigger objects, available fields associated with trigger objects, available events associated with trigger objects, and/or any other type of information available from a system of record for configuring triggers. In some examples, the search interface 702 may provide access to preconfigured trigger templates that a user may utilize, for example, as a starting point when configuring a trigger. Such trigger templates and/or any other types of templates may be provided in addition to or as an alternative to the search interface 702. For example, trigger templates may be provided via a navigable user interface that may include an organized list of folders or other objects that enable multiple different users to define, redefine, use, reuse, and/or perform any other types of activities relating to trigger templates. Example user interface 704 also includes a listing of trigger objects available for selection by a user. For example, a listing of trigger objects may be generated based on any one or more types of entities utilized by a system. In one example, a listing of trigger objects is generated based on identifying one or more types of entities maintained by a system of record. For example, one or more entities available for trigger configuration may be determined and presented based on analyzing one or more data structures 315 associated with a system of record. In addition, information provided to a user may be based on any one or more of organizational subscriptions with third-party applications, configured integrations with third-party applications, permissions of a user, custom entities configured for an organization, custom fields configured for an organization, etc.

As an example, FIG. 8A depicts an illustration of an example user interface 800 for defining a condition for a trigger object when configuring a trigger associated with a rule, according to example embodiments of the present disclosure. In example user interface 800, a user has started to define a trigger object based on an employee entity associated with a rule for managing organizational data 311. In the example user interface 800, the user is presented with an additional interface 802 that allows the user to select a category of attributes associated with an entity (e.g., a category of compensation-related attributes of an employee entity associated with the system of record). The additional interface 802 also provides a listing of selectable fields associated with the current category of attributes in the additional interface 802 (e.g., the listing of specific employee entity attributes in the compensation category). In various examples, one or more categories and/or attributes related to an entity may be determined based on analyzing one or more data structures 315 associated with a system of record.

FIG. 8B depicts an illustration of an example user interface 810 for defining a condition for a trigger object when configuring a trigger associated with a rule, according to example embodiments of the present disclosure. Continuing with the example above from FIG. 8A above, example user interface shows a user selection of the annual compensation attribute 812 of the employee entity. In addition, the user is provided with an additional user interface 814 that enables the user to configure a condition based on annual compensation of the employee entity. The user then may adjust any one or more of the various options presented by the additional user interface 814 and add the desired condition to the trigger. Further, the user may continue one or more additional conditions associated with the employee entity, one or more entities associated with the employee entity (e.g., devices, applications, etc.), one or more third-party applications, and/or any other entities supported by a system of record. Once the user has finished adding conditions for the trigger, then the user can configure one or more operations for the trigger.

Figure 9:
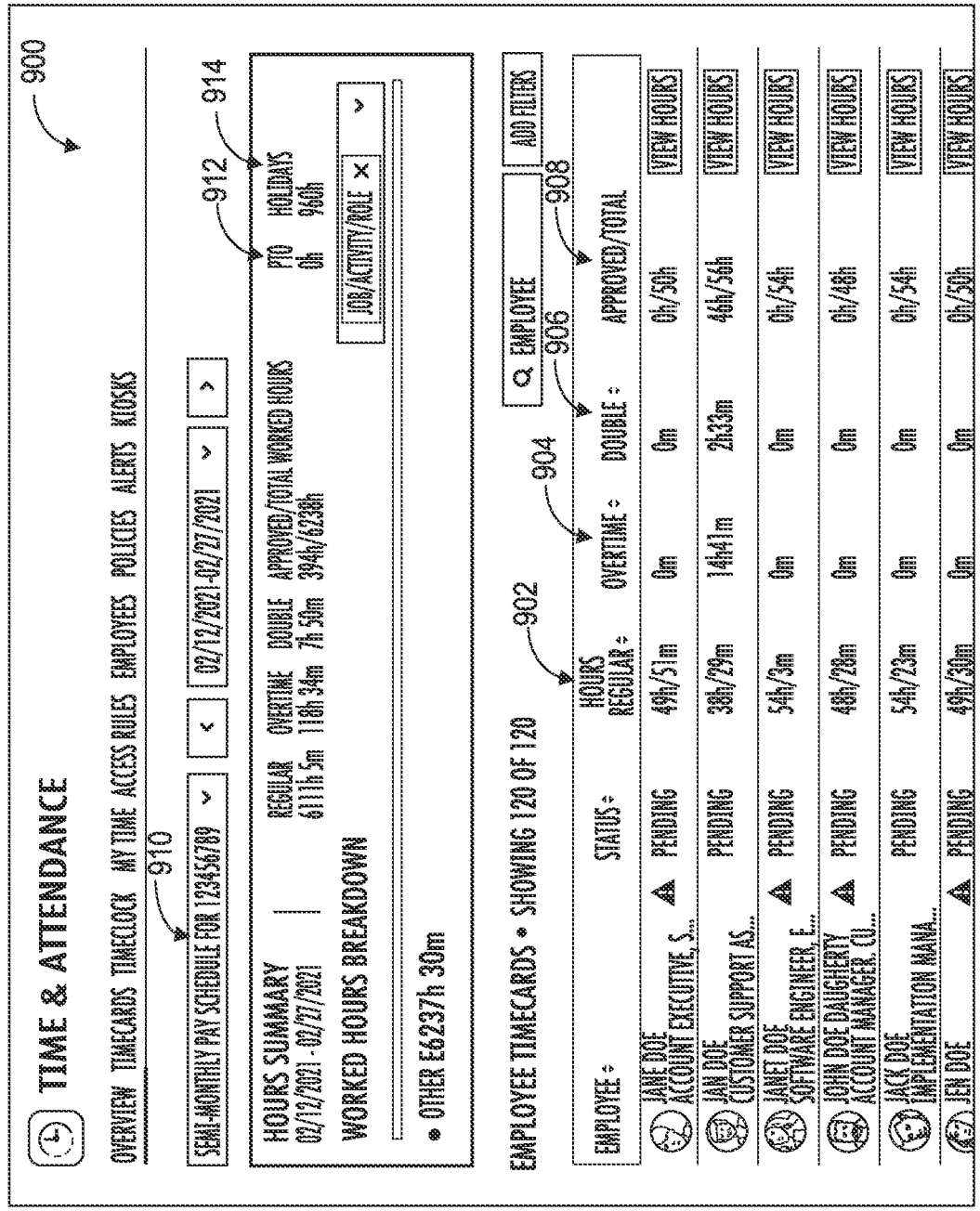
FIG. 9 depicts an illustration of an example user interface for a time and attendance application, according to example embodiments of the present disclosure.

FIG. 9 depicts an illustration of an example user interface 900 for a time and attendance application, according to example embodiments of the present disclosure. In an example, a user can define a condition based on time and attendance data, such as regular hours worked 902, overtime hours worked 904, double overtime hours worked 906, manager approval 908, pay schedule period 910, paid time off 912, and accrued holiday 914, and so on. The time and attendance data can be real-time data that can allow for the system to provide real-time alerts. an association or relationship between two or more entities. As one example, a condition for a trigger associated with a rule may be based on the time and attendance data of an employee.

Numerous details are set forth in the foregoing description. However, it will be apparent to one of ordinary skills in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

What is claimed is:

1. A computer system that implements an organizational management platform to manage applications for an organization, the computer system comprising:
one or more processors;
one or more databases that collectively store organizational data associated with the organization, wherein the organizational data comprises an object graph data structure comprising a plurality of data objects associated with the organizational data; and
one or more non-transitory computer-readable media that collectively store instructions that, when executed by the one or more processors, cause the computer system to perform operations, the operations comprising:
receiving a rule associated with a first trigger, the rule having a condition for activation of the first trigger and a condition for activation of a second trigger;
generating a dependency map associated with the rule, the dependency map having one or more data objects from the plurality of data objects that are associated with the rule;
detecting a change in a first data object from the plurality of the data objects;
determining a dependency between the rule and the first data object based on the dependency map;

determining that the condition for the activation of the first trigger is satisfied based on the detected change in the first data object;

performing an action associated with the activation of the first trigger based on the determination that the condition for the activation of the first trigger has been satisfied, wherein the action associated with the activation of the first trigger is to determine a new dependency between the rule and a second data object based on the dependency map and the condition for activation of the second trigger;

detecting a change in the second data object at a certain time after the activation of the first trigger; and executing an operation associated with the rule based on the detected change in the second data object and the condition for activation of the second trigger.

2. The computer system of claim 1, wherein the applications for the organization managed by the organizational management platform includes a time and attendance application, and wherein the rule is received from a user interface of the time and attendance application.

3. The computer system of claim 2, wherein the user interface allows a user to configure the condition for activation of the first trigger based at least in part on a predictive model trained by data associated with the time and attendance application.

4. The computer system of claim 1, the operations further comprising:

presenting on a user interface a plurality of rules and a plurality of triggers, wherein the received rule is being selected from the plurality of rules, and wherein the first trigger associated with the received rule is selected from the plurality of triggers.

5. The computer system of claim 4, wherein the organizational data includes employee records having a plurality of attributes, and wherein the plurality of rules are associated with the plurality of attributes of the employee records.

6. The computer system of claim 4, the operations further comprising:

receiving a threshold value associated with the received rule; and wherein the determining that the condition for activation of the first trigger is further based on the received threshold value.

7. The computer system of claim 1, wherein the rule is associated with a rule data object, the operations further comprising:

analyzing the rule in view of information describing one or more relationships between each of the plurality of the data objects associated with the organizational data; and wherein the one or more data objects from the plurality of the data objects that are associated with the rule have a relationship with the rule data object.

8. The computer system of claim 1, wherein the object graph data structure further comprises a plurality of rule data objects that correspond to a plurality of rules, and wherein the received rule is selected from the plurality of rules.

9. The computer system of claim 1, wherein the object graph data structure further comprising a plurality of attendance data objects that correspond to attendance data for a plurality of employees of the organization.

10. The computer system of claim 9, wherein the plurality of attendance data objects include the first data object, the operations further comprising:

retrieving, from an attendance database at regular occurring intervals, attendance data associated with the plurality of attendance data objects, the attendance data having an attendance value for the first data object; and wherein the change in the first data object is detected when the attendance value for the first data object has crossed a threshold value.

11. The computer system of claim 1, wherein the action performed with the activation of the first trigger comprises executing an operation associated with a third-party application based at least in part on the organizational data, and wherein the third-party application utilizing at least some of the organizational data.

12. The computer system of claim 1, the operations further comprising:

obtaining regulations associated with a specific industry from a third-party application;

updating the generated dependency map associated with the rule based on the obtained regulations; and updating the condition for activation of the first trigger based on the obtained regulations.

13. A computer-implemented method for implementing an organization management platform to manage applications for an organization, the method comprising:

accessing, by one or more computing devices, organizational data associated with the organization, wherein the organizational data comprises an object graph data structure comprising a plurality of data objects associated with the organizational data;

receiving, by the one or more computing devices, a rule associated with a first trigger, the rule having a condition for activation of the first trigger and a condition for activation of second trigger;

generating, by the one or more computing devices, a dependency map associated with the rule, the dependency map having one or more data objects from the plurality of the data objects that are associated with the rule;

determining, by the one or more computing devices, a change in a first data object from the plurality of the data objects;

determining, by the one or more computing devices, a dependency between the rule and the first data object based on the dependency map;

determining, by the one or more computing devices, that the condition for the activation of the first trigger is satisfied based on the determined change in the first data object;

performing, by the one or more computing devices, an action associated with the activation of the first trigger based on the determination that the condition for the activation of the first trigger has been satisfied, wherein the action associated with the activation of the first trigger is to determine a new dependency between the rule and a second data object based on the dependency map and the condition for activation of the second trigger;

detecting, by the one or more computing devices, a change in the second data object at a certain time after the activation of the first trigger; and executing, by the one or more computing devices, an operation associated with the rule based on the detected change in the second data object and the condition for activation of the second trigger.

14. The computer-implemented method of claim 13, further comprising:

presenting on a user interface, by the one or more computing devices, a plurality of rules and a plurality of triggers, wherein the received rule is being selected from the plurality of rules, and wherein the first trigger associated with the received rule is selected from the plurality of triggers.

15. The computer-implemented method of claim 13, wherein the rule is associated with a rule data object, further comprising:
    analyzing, by the one or more computing devices, the rule in view of information describing one or more relationships between each of the plurality of the data objects associated with the organizational data; and
    wherein the one or more data objects from the plurality of the data objects that are associated with the rule have a relationship with the rule data object.

16. The computer-implemented method of claim 13, wherein the object graph data structure further comprising a plurality of attendance data objects that correspond to attendance data for a plurality of employees of the organization, and wherein the plurality of attendance data objects include the first data object, the method further comprising:
    retrieving, by the one or more computing devices, from an attendance database at regular occurring intervals, attendance data associated with the plurality of attendance data objects, the attendance data having an attendance value for the first data object; and
    wherein the change in the first data object is detected when the attendance value for the first data object has crossed a threshold value.

17. The computer-implemented method of claim 13, wherein the action associated with the activation of the first trigger is to determine a new dependency between the rule and a second data object based on the dependency map and the condition for activation of the first trigger, the method further comprising:
    detecting, by the one or more computing devices, a change in the second data object at a certain time after the activation of the first trigger; and
    executing, by the one or more computing devices, an operation associated with the rule based on the detected change in the second data object, the operation being performed based at least in part on the organizational data associated with the organization.

18. One or more non-transitory computer-readable media that collectively store instructions that, when executed by one or more computing devices, cause the one or more computing devices to perform operations, the operations comprising:
    accessing organizational data associated with the organization, wherein the organizational data comprises an object graph data structure comprising a plurality of data objects associated with the organizational data;
    receiving a rule associated with a first trigger, the rule having a condition for activation of the first trigger and a condition for activation of second trigger;
    generating a dependency map associated with the rule, the dependency map having one or more data objects from the plurality of the data objects that are associated with the rule;
    determining a change in a first data object from the plurality of the data objects;
    determining dependency between the rule and the first data object based on the dependency map;
    determining that the condition for the activation of the first trigger is satisfied based on the determined change in the first data object; and
    performing an action associated with the activation of the first trigger based on the determination that the condition for the activation of the first trigger has been satisfied, wherein the action associated with the activation of the first trigger is to determine a new dependency between the rule and a second data object based on the dependency map and the condition for activation of the second trigger;
    detecting a change in the second data object at a certain time after the activation of the first trigger; and
    executing an operation associated with the rule based on the detected change in the second data object and the condition for activation of the second trigger.

19. A computer system that implements an organizational management platform to manage applications for an organization, the computer system comprising:
    one or more processors;
    one or more databases that collectively store organizational data associated with the organization, wherein the organizational data comprises an object graph data structure comprising a plurality of data objects associated with the organizational data, wherein the object graph data structure further comprising a plurality of attendance data objects that correspond to attendance data for a plurality of employees of the organization, and wherein the plurality of attendance data objects include a first data object; and
    one or more non-transitory computer-readable media that collectively store instructions that, when executed by the one or more processors, cause the computer system to perform operations, the operations comprising:
        retrieving, from an attendance database at regular occurring intervals, attendance data associated with the plurality of attendance data objects, the attendance data having an attendance value for the first data object;
        receiving a rule associated with a first trigger, the rule having a condition for activation of the first trigger;
        generating a dependency map associated with the rule, the dependency map having one or more data objects from the plurality of the data objects that are associated with the rule;
        detecting a change in the first data object from the plurality of the data objects, wherein the change in the first data object is detected when the attendance value for the first data object has crossed a threshold value;
        determining a dependency between the rule and the first data object based on the dependency map;
        determining that the condition for the activation of the first trigger is satisfied based on the detected change in the first data object; and
        performing an action associated with the activation of the first trigger based on the determination that the condition for the activation of the first trigger has been satisfied.

20. A computer system that implements an organizational management platform to manage applications for an organization, the computer system comprising:
    one or more processors;
    one or more databases that collectively store organizational data associated with the organization, wherein the organizational data comprises an object graph data structure comprising a plurality of data objects associated with the organizational data; and
    one or more non-transitory computer-readable media that collectively store instructions that, when executed by the one or more processors, cause the computer system to perform operations, the operations comprising:

receiving a rule associated with a first trigger, the rule having a condition for activation of the first trigger;
generating a dependency map associated with the rule, the dependency map having one or more data objects from the plurality of the data objects that are associated with the rule;
obtaining regulations associated with a specific industry from a third-party application;
updating the generated dependency map associated with the rule based on the obtained regulations;
updating the condition for activation of the first trigger based on the obtained regulations;
detecting a change in a first data object from the plurality of the data objects;
determining a dependency between the rule and the first data object based on the dependency map;
determining that the condition for the activation of the first trigger is satisfied based on the detected change in the first data object; and
performing an action associated with the activation of the first trigger based on the determination that the condition for the activation of the first trigger has been satisfied.

* * * * *